US012676750B2

(12) United States Patent
Zilbershtein et al.

(10) Patent No.: US 12,676,750 B2
(45) Date of Patent: Jul. 7, 2026

(54) METHODS, SYSTEMS, AND DEVICES FOR SERVER CONTROL OF CLIENT AUTHORIZATION PROOF OF POSSESSION

(71) Applicant: Synamedia Limited, Staines Upon Thames (GB)

(72) Inventors: Itai Ephraim Zilbershtein, Hod Hasharon (IL); Moshe Elad, Gedera (IL); Ezra Darshan, Beit Shemesh (IL); David Livshits, Geva Binyamin (IL); Michael Joseph Burns, Jerusalem (IL); Assaf Yosef Tamir, Jerusalem (IL)

(73) Assignee: Synamedia Limited, Maidenhead (GB)

( * ) Notice: Subject to any disclaimer, the term of this patent is extended or adjusted under 35 U.S.C. 154(b) by 6 days.

(21) Appl. No.: 17/585,522

(22) Filed: Jan. 26, 2022

(65) Prior Publication Data

US 2022/0417241 A1     Dec. 29, 2022

Related U.S. Application Data

(60) Provisional application No. 63/215,630, filed on Jun. 28, 2021.

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC .......... *H04L 9/3242* (2013.01); *H04L 9/0891* (2013.01); *H04L 9/3213* (2013.01); (Continued)

(58) Field of Classification Search
CPC ............. H04L 63/0807; H04L 63/0823; H04L 63/0876; H04L 9/3242; H04L 9/3213; H04L 9/3247; H04L 9/0891
See application file for complete search history.

(56) References Cited

U.S. PATENT DOCUMENTS

| | | | | |
|---|---|---|---|---|
| 9,003,189 | B2 * | 4/2015 | Yin | ........................ G06F 21/335 |
| | | | | 713/168 |
| 11,153,098 | B2 * | 10/2021 | Wentz | ................... H04L 9/0861 |

(Continued)

OTHER PUBLICATIONS

Alcatel-Lucent: "pCR to TR 33.cde—Incorporating OAuth 2.0 proof-of-possession security mechanism in IMS_WebRTC," 3GPP Draft; S3-142511, vol. SA WG3, Nov. 10, 2014, Retrieved from the Internet: https://www.3gpp.org/ftp/tsg_sa/WG3_Security/TSGS3_77_SanFrancisco/Docs/, pp. 1-10.

(Continued)

*Primary Examiner* — Zachary A. Davis

(74) *Attorney, Agent, or Firm* — Fernando & Partners, LLP

(57) ABSTRACT

Techniques for server control of client authorization proof of possession are described herein. In various embodiments, a first server provisions client authorization proof of possession for a client device a real-world time, a client public key, and a client private key. The first server generates provisioning response message(s) including the client public key, the client private key, the real-world time, and/or an assertion object, and sends the message(s) to the client device. In various embodiments, a client device obtains an authorization proof token generated based on a client public key, a client private key, and a real-world time provisioned by a first server. The client device generates a request and sends the request to a second server, the request includes the authorization proof token and an assertion object from the first server signed by a server private key and an expiration time and a reference to the client public key.

19 Claims, 19 Drawing Sheets

1200

At a first server including one or more processors and a non-transitory memory — 1210

Provision for a client device a real-world time, a client public key, and a client private key — 1220

Generate one or more provisioning messages that include one or more of the client public key, the client private key, the real-world time, and an assertion object, wherein the assertion object includes a reference to the client public key — 1230

Send the one or more provisioning response messages to the client device — 1240

(52) U.S. Cl.
CPC ........ *H04L 9/3247* (2013.01); *H04L 63/0442*
(2013.01); *H04L 63/0807* (2013.01); *H04L*
*63/0876* (2013.01)

(56) References Cited

U.S. PATENT DOCUMENTS

| | | | | |
|---|---|---|---|---|
| 2006/0224890 | A1* | 10/2006 | Zhou | H04L 63/0876 |
| | | | | 713/172 |
| 2019/0068562 | A1 | 2/2019 | Iyer et al. | |
| 2019/0124070 | A1* | 4/2019 | Engan | H04L 9/3247 |
| 2020/0287726 | A1* | 9/2020 | Garnier | H04L 67/12 |
| 2021/0226794 | A1* | 7/2021 | Axdorff | H04W 12/084 |
| 2021/0258308 | A1 | 8/2021 | Avetisov et al. | |

OTHER PUBLICATIONS

PCT International Search Report and Written Opinion dated Dec. 7, 2022, PCT International Application No. PCT/GB2022/052340, pp. 1-13.
PCT International Search Report and Written Opinion dated Dec. 15, 2022, PCT International Application No. PCT/GB2022/052341, pp. 1-12.

* cited by examiner

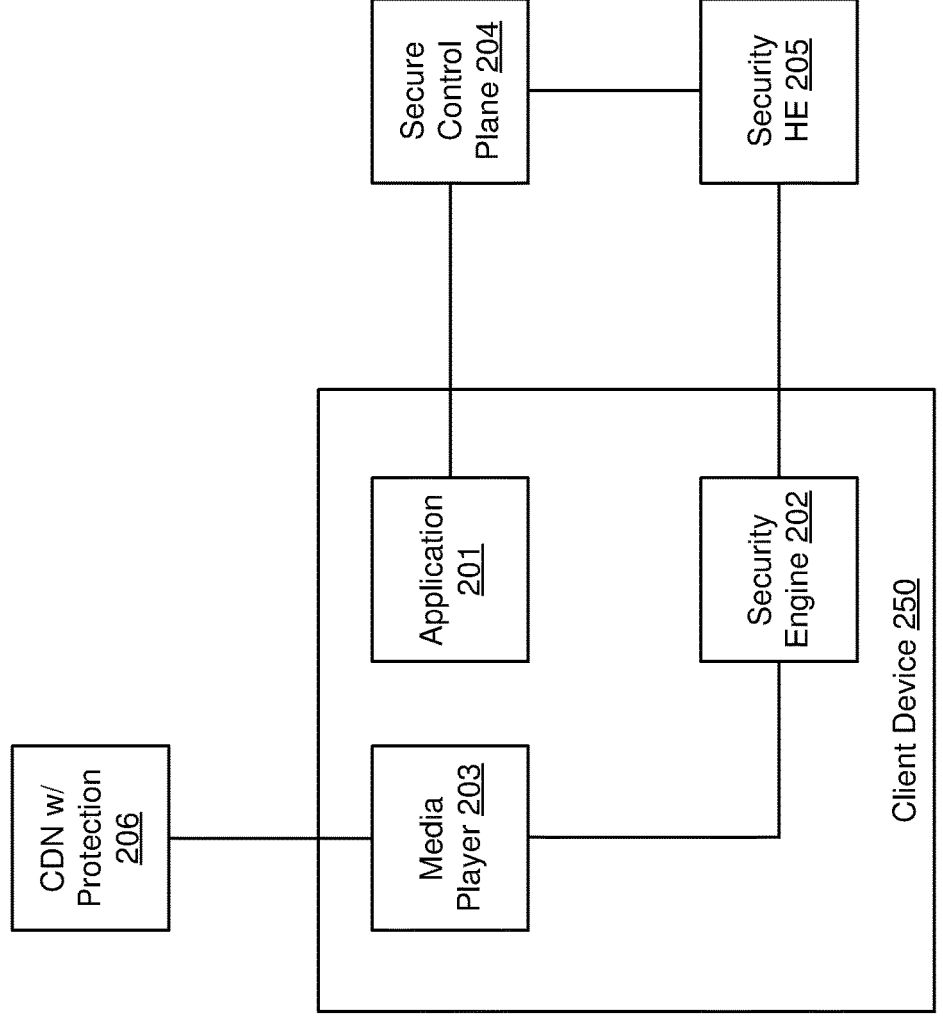
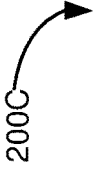
Figure 2C

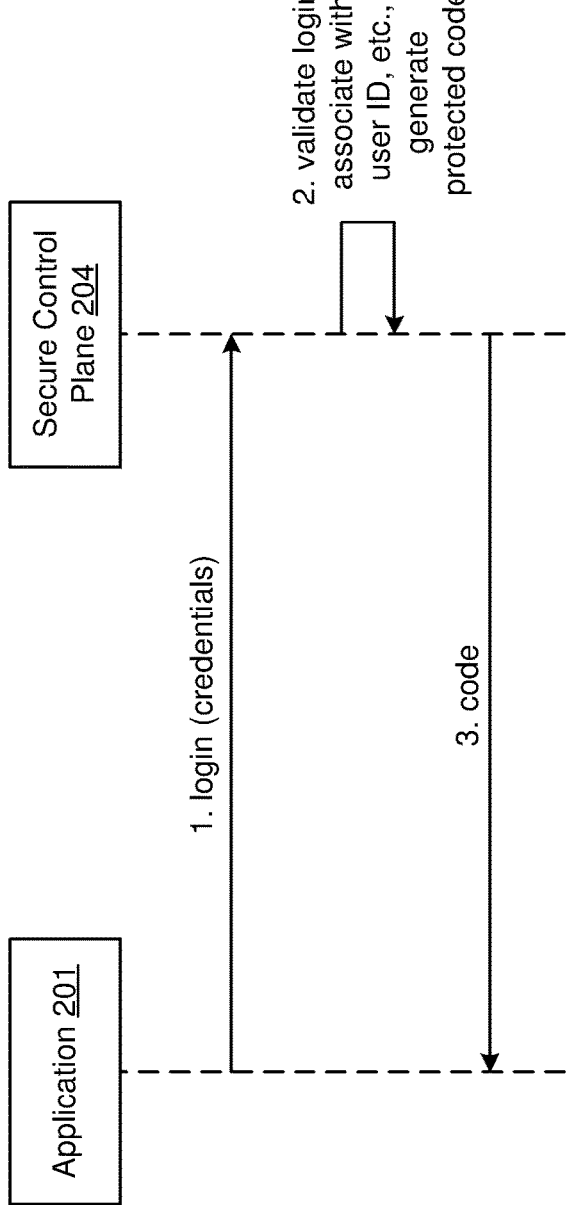
Figure 4

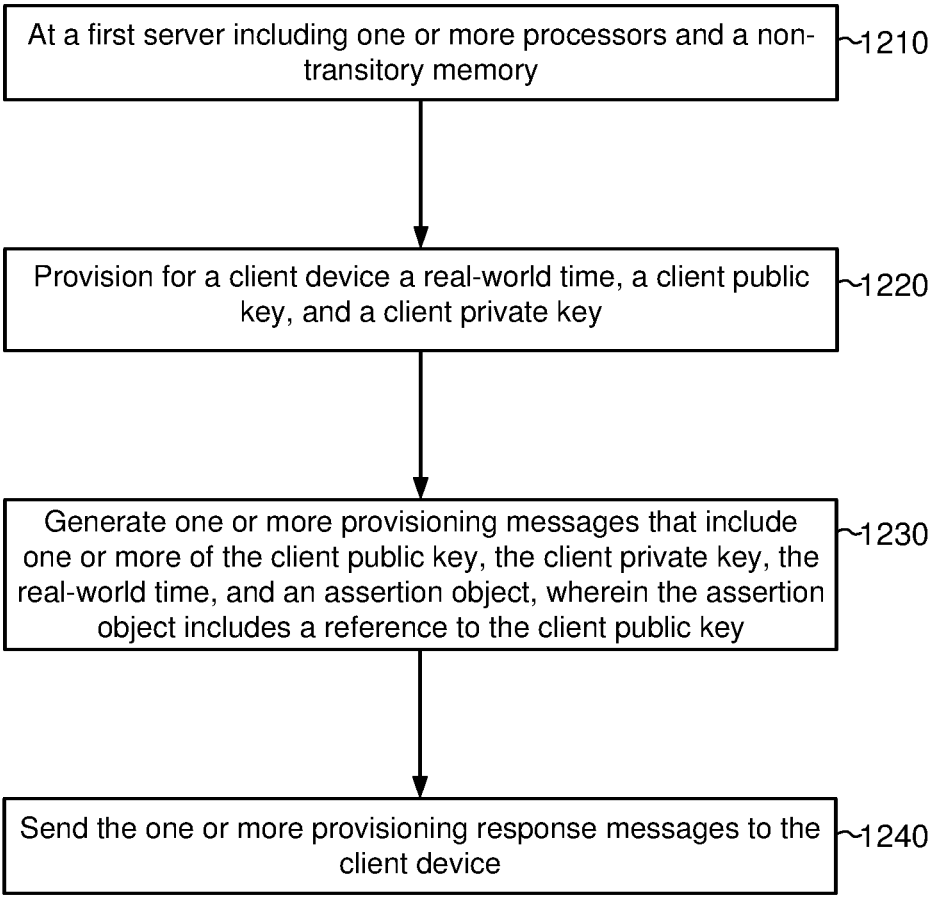

1200

At a first server including one or more processors and a non-transitory memory ~1210

Provision for a client device a real-world time, a client public key, and a client private key ~1220

Generate one or more provisioning messages that include one or more of the client public key, the client private key, the real-world time, and an assertion object, wherein the assertion object includes a reference to the client public key ~1230

Send the one or more provisioning response messages to the client device ~1240

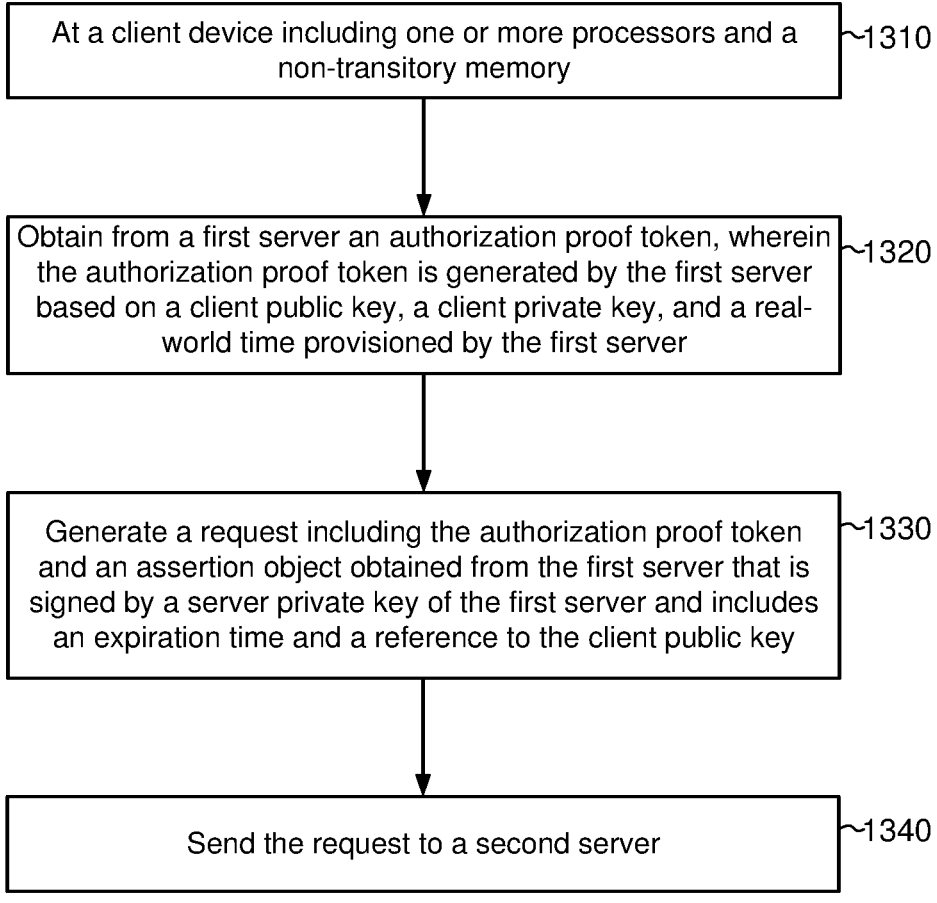

At a client device including one or more processors and a non-transitory memory ~1310

Obtain from a first server an authorization proof token, wherein the authorization proof token is generated by the first server based on a client public key, a client private key, and a real-world time provisioned by the first server ~1320

Generate a request including the authorization proof token and an assertion object obtained from the first server that is signed by a server private key of the first server and includes an expiration time and a reference to the client public key ~1330

Send the request to a second server ~1340

Figure 13

METHODS, SYSTEMS, AND DEVICES FOR SERVER CONTROL OF CLIENT AUTHORIZATION PROOF OF POSSESSION

CROSS-REFERENCE TO RELATED APPLICATION

This application claims priority to U.S. provisional patent application No. 63/215,630 filed on Jun. 28, 2021, the contents of which are hereby incorporated by reference.

TECHNICAL FIELD

The present disclosure relates generally to anti-piracy and, more specifically, to methods, devices, and systems of server controlled client authorization proof of possession.

BACKGROUND

Web security systems, including content distribution systems (e.g., content delivery networks (CDNs)), grapple with the problem of gating access to content and/or services, e.g., assuring that access is granted to authenticated and authorized clients. Many systems have one authentication subsystem for ascertaining that the user at a client device is who they claim to be and another separate authorization subsystem for allowing access to the information provided by a server. The separation between the client authentication and authorization sub-systems complicates the aforementioned problem but is necessary for various reasons.

First, one set of business entities for providing subscription services to users is often responsible for authentication, e.g., managing user accounts, while a different set of business entities (e.g., entities running CDNs) typically provides content and/or cache media content requested by the users. As such, while one in the business of subscription selling, e.g., a subscription seller, is responsible for authentication and authorizing the authenticated subscribers, a different business is responsible for providing resources based on the authorization, e.g., providing the content and/or services for which a subscription is purchased based on the authorization provided by the subscription seller.

Second, authentication often involves a human user providing something they know, e.g., a password or a one-time code provided out-of-band. Frequent authentications are burdensome. As such, systems are often designed to perform authentications as few times as possible to reduce user annoyance, which may drive users away and cause revenue loss. On the other hand, to protect against unauthorized access, systems typically perform frequent authorizations, e.g., whenever a file or service is requested and/or for every asset and/or file retrieval request.

Some previously existing systems use tokens (also referred to hereinafter as "authorization tokens" or "access tokens") to eliminate direct communications between separate sub-systems that belong to separate business entities. The tokens carry information from the authentication stage to the resource access stage, where an authorization token is required to access resources. Upon authenticating a user, the authentication sub-system issues a signed token. When a user requests content, the signed token is sent along with the request as a proof of identity. The authorization sub-system verifies the signed token and responds to the request upon determining that the signed token is authentic. However, while the authorization sub-system has the means to validate a token, it has no means to directly authenticate the user. Consequently, in such previously existing systems, the authorization sub-system cannot verify that the token being presented has really been granted to the client. Accordingly, in the case of a pirate pretending to be a legitimate user, e.g., by presenting a copied or cloned token, the authorization sub-system in such previously existing systems cannot verify the authenticity of the token, thus allowing unauthorized access to resources by the pirate.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 2A-2C are block diagrams of exemplary content delivery systems with server controlled client authorization proof of possession, in accordance with some embodiments;

FIGS. 4, 5A-5C, 6-8, 9A-9B, and 10-11 are sequence diagrams illustrating interactions between the client side and the server side at various states of server controlled client authorization proof of possession for secure authorization, in accordance with some embodiments;

FIG. 12 is a flowchart illustrating a provisioning method for server controlled client authorization proof of possession, in accordance with some embodiments;

FIG. 13 is a flowchart illustrating a method for a client presenting a server provisioned authorization proof of possession, in accordance with some embodiments.

Figure 1:
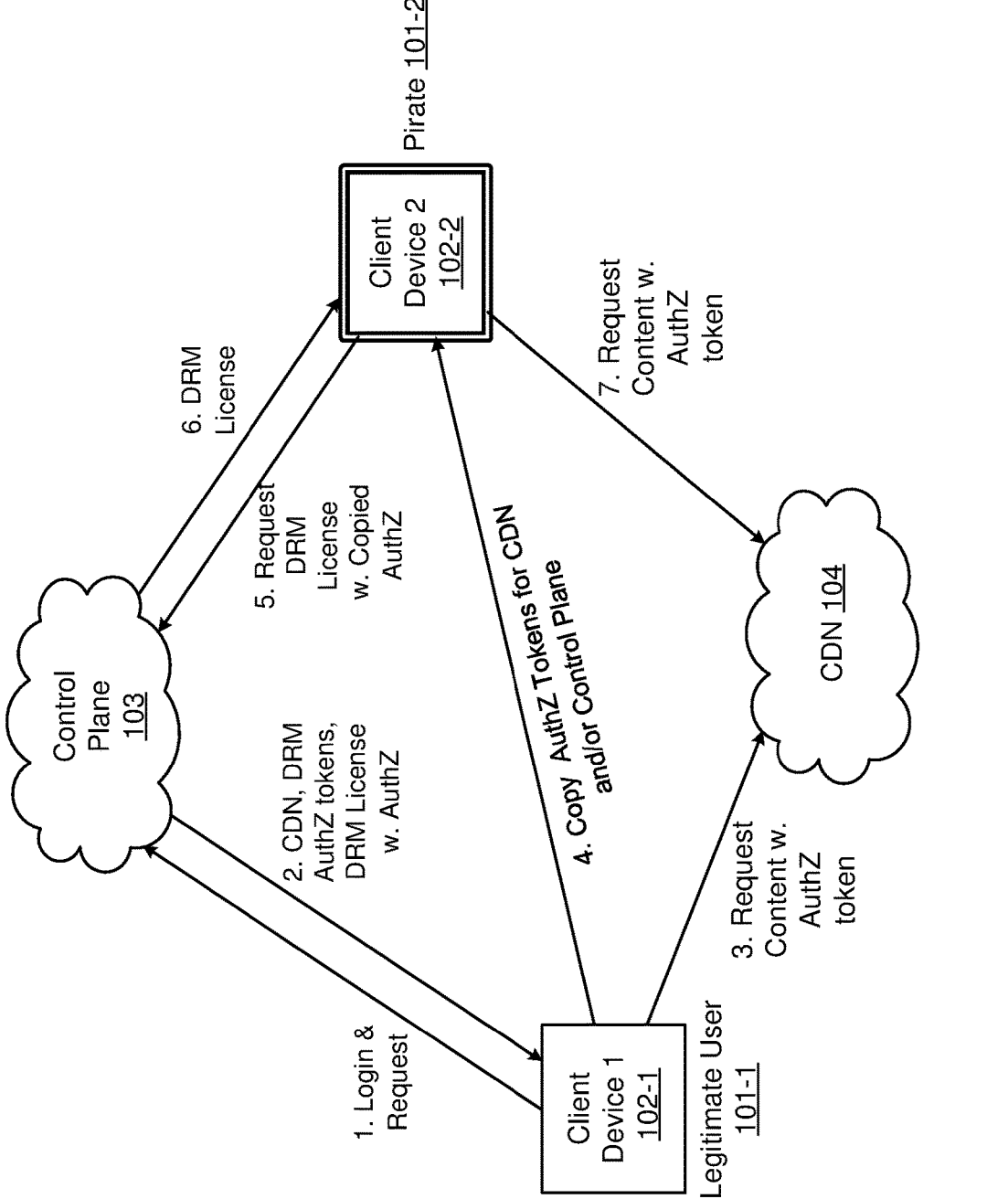
FIG. 1 is a block diagram of a content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, an end-to-end (E2E) system with enhanced authentication and authorization mitigates the aforementioned authentication and authorization issues. The E2E system includes a security headend on the server side and a security engine on the client side in accordance with some embodiments. On the client side, in some embodiments, the security engine creates a secure security association (e.g., activation during login) with the security headend as part of client authentication that requires user credentials. Using the information exchanged during the initial login, the security headend provisions keys for a client device, sends the keys to the client device through secure messages, and establishes a secure time base to prevent potential tampering or misconfiguration. The client device can then use the keys provisioned by the security headend to prove its identify as it requests authorization tokens and present an authorization proof token to resource servers in accordance with some embodiments. With the server provisioning the keys and the secure time base, the E2E system described herein, e.g., including the security headend and the security engine, enhances the overall system security and protects the cryptographic proof of possession (e.g., the authorization proof token) from potential tampering.

In accordance with various embodiments, a provisioning method for server controlled client authorization proof of possession is performed at a first server (e.g., a security headend) that includes one or more processors and a non-transitory memory. In some embodiments, the first server provisions for a client device a real-world time, a client public key, and a client private key. The first server further generates one or more provisioning response messages that include one or more of the client public key, the client private key, the real-world time, and an assertion object, where the assertion object includes a reference to the client public key. Additionally, the first server sends the one or more provisioning response messages to the client device.

In accordance with various embodiments, a method for a client presenting a server provisioned authorization proof for authorization and access to resources is performed at a client device that includes one or more processors and a non-transitory memory. In some embodiments, the client device obtains an authorization proof token, where the authorization proof token is generated based on a client public key, a client private key, and a real-world time provisioned by a first server. The client device further generates a request including the authorization proof token and an assertion object obtained from the first server that is signed by a server private key of the first server and includes an expiration time and a reference to the client public key. The client device then sends the request to a second server.

Example Embodiments

Some previously existing methods propose using a cryptographic proof of possession to mitigate the authentication and authorization issues described above. These methods fall short of describing how to protect the cryptographic proof from cloning attacks on the client side and how to protect the overall system from an attacker that manufactures bogus cryptographic identities. Moreover, some methods rely on the assumption that the client environment is trustworthy. As such, once the client environment is hacked into, previously existing systems cannot verify the authenticity of access tokens and are vulnerable to attacks initiated by pirates that present bogus cryptographic proofs. In contrast, the authentication and authorization system described herein provisions keys and a secure time base for client devices on the server side. The server side provision allows servers (e.g., authorization servers and/or resource servers) to ascertain that client keys in the requests from the client devices are indeed issued to the clients by a security headend on the server side. Accordingly, the server controlled client authorization proof of possession described herein enhances the security of the overall system and improves the protection of the cryptographic proof from attacks.

As explained above, many systems that have separate authentication and authorization sub-systems use tokens (also referred to hereinafter as "authorization tokens" or "access tokens") to carry information from the authentication stage to the resource access stage. Over-the-top (OTT) streaming is an example of such a system, where authentication of a user using a client device is carried out by one sub-system, referred to hereinafter as "the control plane", and the resource service is performed in another sub-system, e.g., a content delivery network (CDN). The authentication and authorization sub-systems in OTT streaming are thus precursors to getting an authorization token provided to the subscriber for access to resources (e.g., media content and/or services). FIG. 1 is a block diagram of an exemplary OTT content delivery system 100, in accordance with some embodiments.

In FIG. 1, a legitimate user 101-1 uses client device 1 102-1 to login to a control plane 103 and to request tokens from the control plane 103. In some embodiments, the control plane 103 is a server that performs multiple tasks, such as login authentication, authorization, and/or providing resources. During the login phase, the control plane 103 authenticates the legitimate user 101-1 based on the information received from client device 1 102-1. Upon authenticating the legitimate user 101-1, the control plane 103 sends to client device 1 102-1 authorization tokens for CDN access. Client device 1 102-1 can then use the CDN authorization token to request content and access media on a CDN 104. In some embodiments, for access to resources, the control plane 103 also sends to client device 1 102-1 digital rights management (DRM) licenses, etc. In the case of the media content being protected with DRM, client device 1 102-1 uses a DRM authorization token as part of a license request to get specific DRM license(s) for decryption.

In the system 100 as shown in FIG. 1, a pirate 101-2 obtains a copy of the authorization tokens from client device 1 102-1, e.g., by observing the authorization tokens for the control plane 103 and/or the CDN 104 or by observing tokens in open platforms such as a browser used for running a web application on client device 1 102-1. The pirate 101-2 at client device 2 102-2 then uses a cloned CDN authorization token to request and obtain media content from the CDN 104. Even if the media content is protected with DRM, the pirate 101-2 may use a cloned DRM authorization token and/or other cloned tokens obtained from the control plane 103 to get license key(s) for DRM protected media content. As such, the client side in the exemplary OTT content delivery system 100 is insecure and the security weakness allows the pirate 101-2 to gain access to resources in the system 100.

Figure 2A:
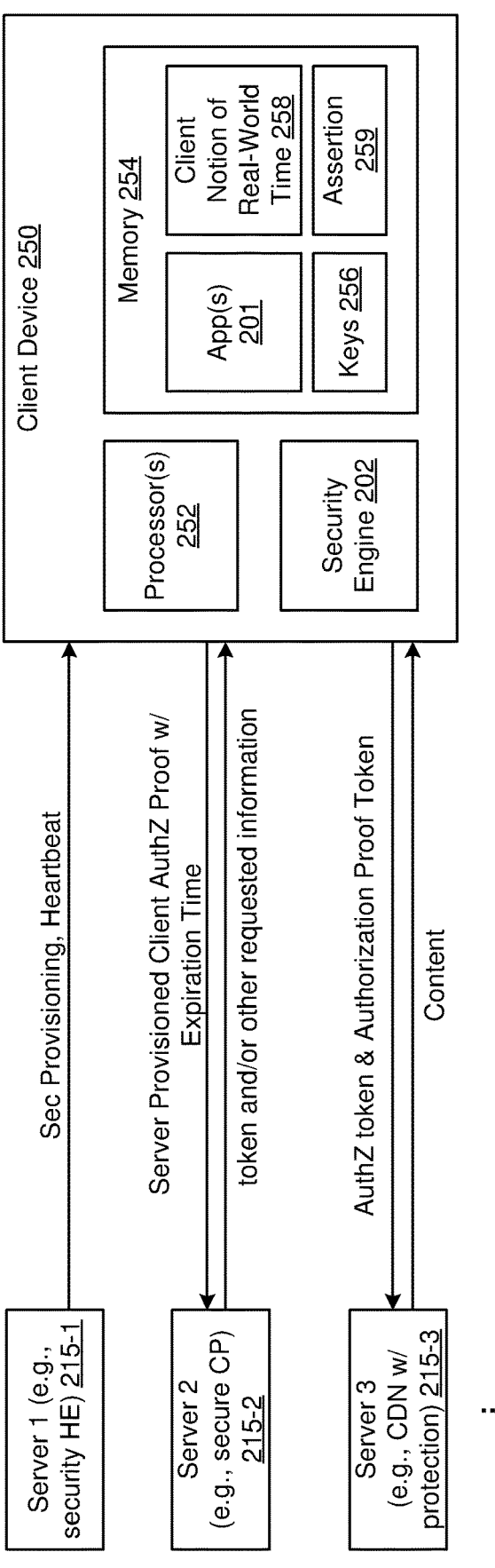

FIG. 2A is an exemplary content delivery system 200A that controls client authorization proof of possession at the server side in accordance with some embodiments. In some embodiments, the server side includes one or more servers 215, e.g., server 1 215-1, server 2 215-2, server 3 215-3, etc., and the client side includes a plurality of client devices, including an exemplary client device 250. In some embodiments, the exemplary client device 250 includes one or more processors 252 for executing one or more applications 201 stored in a non-transitory memory 254, the non-transitory memory 254, and a secure engine 202 that interacts with the plurality of servers 215. In some embodiments, server 1

215-1 includes a security headend that performs security provisioning of the client device 250 and performs security heartbeat to align a client notion of real-world time (also referred to hereinafter as "a client notion of time", "a client time", or "a notion of real-world time at the client device") with a server notion of real-world time (also referred to hereinafter as "a server notion", "a server time", or "a notion of real-world time at the server"). In some embodiments, the security engine 202 interacts with server 1 215-1, obtains data provisioned by server 1 215-1 (e.g., keys 256), and stores the data, a client notion of real-world time 258, and/or an assertion object 259 in the non-transitory memory 254.

In some embodiments, using the keys 256 and the client notion of real-world time 258, the security engine 202 generates an authorization proof token with an expiration time and sends the authorization proof token to server 2 215-2 (e.g., a secure control plane). Server 2 215-2, upon validating the authorization proof token, sends token and/or other information for access resources to the client device 250. The client device 250 can then use the tokens and/or other access details to request and access resources and/or content on server 3 215-3, e.g., a CDN with protection.

Relative to the exemplary system 100 in FIG. 1, the content delivery system 200A is more secure because the keys 256, the client notion of real-world time 258, and the assertion object 259 are provisioned and controlled by secure server 1 215-1. Further, the authorization proof token is generated by the security engine 202 based on the server provisioned keys 256 and the client notion of real-world time 258. As such, the servers 215-1, 215-2, and 215-3 can verify the legitimacy of the information presented by the client device 250. Accordingly, even with different business entities running different servers 215 that have different authentication and/or authorization roles, e.g., server 1 215-1, server 2 215-2, and/or server 3 215-3 are distinct, separate, and/or non-collocated, the secure system 200A can verify the cryptographic proof of possession and protect the resources on the servers 215.

It should be noted that the exemplary secure system 200A can include more, less, and/or different elements than shown in FIG. 2A. Further, each of the elements in the exemplary system 200A can include more, less, and/or different sub-elements than shown in FIG. 2A. For example, the memory 524 stores programs, modules and data structures, or a subset thereof including an optional operating system and the security engine 202 in addition to the application(s) 201, the keys 256, the client notion of real-world time 258, and/or the assertion object 259. As such, the security engine 202 includes a set of instructions and heuristics and metadata to be executed by the processor(s) 252. Additionally, each of the elements in the exemplary system 200A can include appropriate hardware, software, firmware, and/or virtual machines to perform the operations attributed to the element herein. Operation(s) attributed to an element in the exemplary system 200A herein should not be considered binding and in some embodiments, other element(s) in the exemplary system 200A may additionally or alternatively perform such operation(s). Various embodiments of the exemplary system 200A are shown in FIGS. 2B and 2C and described in further detail below.

Figure 2B:
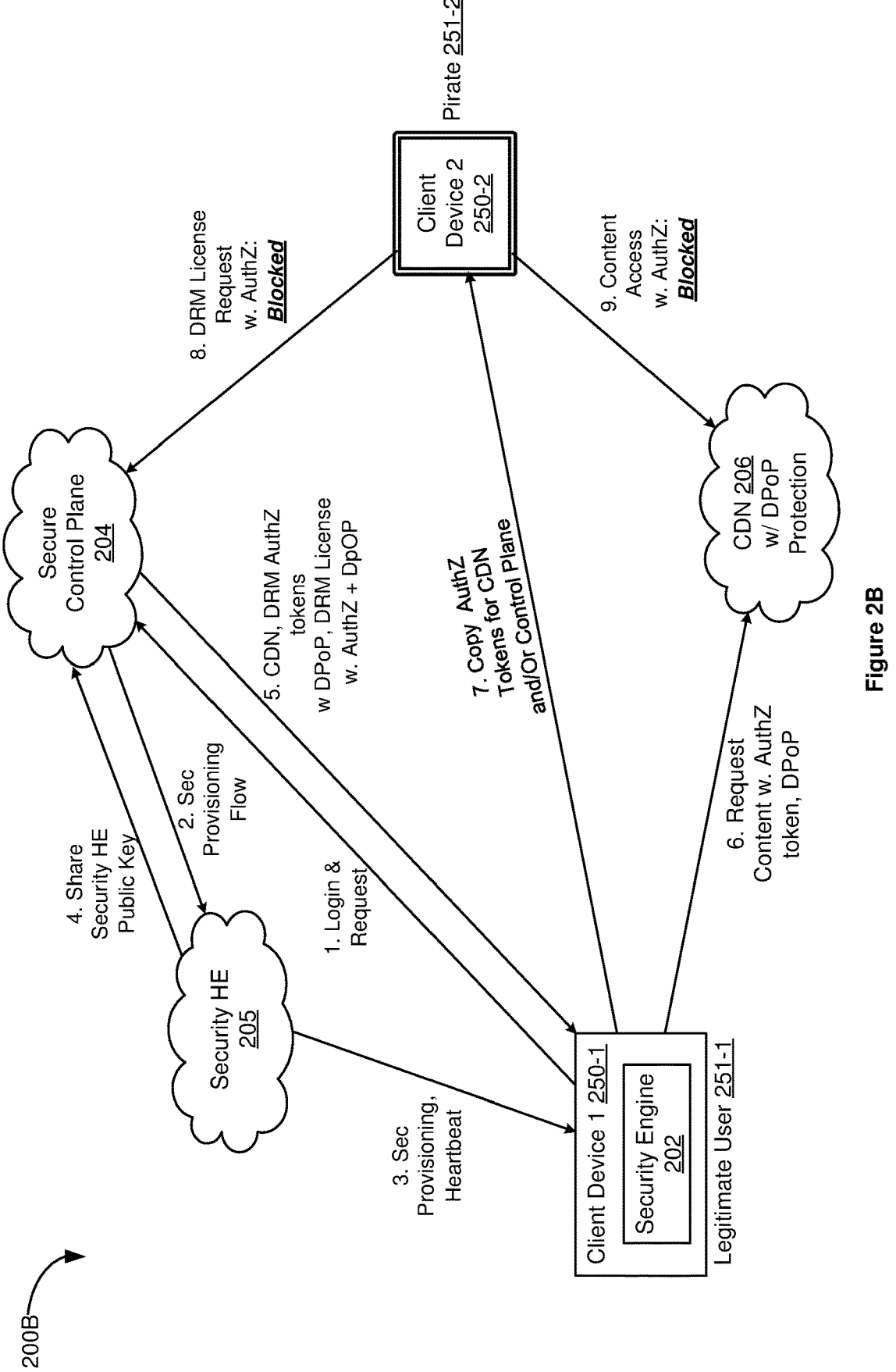

FIG. 2B shows an example of an end-to-end secure content delivery system 200B with multiple servers on the server side for server controlled client authorization proof of possession, in accordance with some embodiments. In step 1 of FIG. 2B, a legitimate user 251-1 uses client device 1 250-1 to login to a secure control plane 204 (e.g., server 2 215-2 in FIG. 2A). In some embodiments, client device 1

250-1 includes the security engine 202, e.g., a security software development kit (SDK) implementing the security engine 202 as described above with reference to FIG. 2A. In some embodiments, the login process initiates the activation flow for the security engine 202.

In some embodiments, in response to receiving the login request from client device 1 250-1, the secure control plane 204 interacts with a security headend 205 (e.g., server 1 215-1 in FIG. 2A) to initiate activation and security provisioning of client device 1 250-1 in step 2. In some embodiment, the security headend 205, which has security services running on one or more servers, takes part in the security provisioning of client device 250-1, interacts with the security engine 202, and sends the output of the security provisioning in one or more messages to the security engine 202 in step 3. In some embodiments, the output of the security provisioning includes a secured cryptographic identity corresponding to client device 1 250-1, which is represented as secured keys with which client device 1 250-1 can subsequently sign requests and demonstrate proof of possession of tokens, and/or an assertion object signed using a private key of the security headend 205. In some embodiments, the output of the security provisioning also includes a secured and aligned time base, which makes sure that a client notion of time is aligned with the server it interacts with, e.g., aligned with the server notion of time on various server(s) such as the security headend 205, the secure control plane 204, and/or a CDN 206 with proof of possession protection.

As used herein, a token is a piece of data that has no meaning or use on its own, but when combined with certain tokenization systems, the token becomes a vital player in secure applications. Token-based authentication works by ensuring that each request to a server is accompanied by a signed token, where the server responds upon verifying the authenticity of the signed token.

Also as used herein, an assertion object (also referred to as "an assertion" or "a client assertion") is a package of information that facilitates the sharing of identity and security information across security domains. In some embodiments, the assertion object is used as part of an open standard for access delegation (e.g., OAUTH) flow, in which a client requests an authorization token from an authorization server and provides in the request an authorization grant received from the entity that authenticated and/or approved the client identity. In such embodiments, the assertion is created by the entity that validated client information so that the authorization server can validate the client when the client signs in.

Additionally, as used herein, an authorization server provides eligible clients with authorization tokens, which may later be used by the clients when accessing resources and services on resource servers as well as when requesting from the authorization server to refresh an expired authorization token. A resource server, as used herein, provides resources (e.g., media files) or services (e.g., facilitating a DRM license request) to eligible clients, where the eligibility is determined based on the authorization token and possibly based on the proof of possession presented by the clients when requesting the resources and/or services.

In some embodiments, in addition to or as part of the login request in step 1, client device 1 250-1 also requests authorization tokens from the secure control plane 204. In some embodiments, to request the authorization tokens, client device 1 250-1 presents an authorization proof token and an assertion object (e.g., the assertion object 259 in FIG. 2A). For example, the authorization proof token can be a demonstrating proof of possession (DPoP) token as defined in the Internet Engineering Task Force (IETF) Web Authorization Protocol (OAuth) Demonstrating Proof-of-Possession at the Application Layer draft) or any other data so that that the combination of the data and the assertion object demonstrates the keys presented by client device 1 250-1 (e.g., the keys 256 in FIG. 2A) are indeed issued to client device 1 250-1 by the security headend 205. As such, an authorization proof token is also referred to hereinafter as a DPoP token, a proof of possession token, a proof token, or a proof of possession.

It should be noted that the secure control plane 204 has multiple roles. During the login phase, the secure control plane 204 is a login authentication server that authenticates the clients. In the initial provisioning phase, the secure control plane 204 is an application initial provisioning server to facilitate the generation of an initial provisioning token by the security headend 205. In the application authorization phase, the secure control plane 204 is an application authorization server that produces application access tokens (e.g., application authorization tokens and/or application authorization refresh tokens). In the resource access authorization phase, the secure control plane 204 is an application resource access server for obtaining access details to resource servers (e.g., CDNs), including obtaining access tokens (also referred to hereinafter as "resource server access tokens" or "CDN access tokens") as tokens to resource servers other than the application resource server or the secure control plane 204. Further, in some embodiments, the secure control plane 204 can be a resource server for services rendered to a client presenting an application access token.

For verification, in some embodiments, the authorization proof token is signed with a client private key provisioned by the security headend 205 and verifiable by a client public key inside the authorization proof token. For example, the authorization proof token can include a client public key and a client private key provisioned by the server and securely stored as the keys 256 (FIG. 2A) on client device 1 250-1. In some embodiments, the assertion object (e.g., the assertion object 259, FIG. 2A) includes the client public key that the security headend 205 provisioned for client device 1 250-1, and the assertion object is signed by a server private key of the security headend 205. As such, once the security headend 205 shares a server public key of the security headend 205 with the secure control plane 204 in step 4 in accordance with some embodiments, the secure control plane 204 can apply the server public key and validate that indeed the client public key is provisioned by the security headend 205 for client device 1 250-1. Upon successful authentication and validation, the secure control plane 204 sends tokens and/or other information to client device 1 250-1 in step 5 for access to resources, e.g., sending CDN authorization tokens, DRM authorization tokens, and/or DRM licenses, etc. to client device 1 250-1.

In some embodiments, when sending the information to client device 1 250-1 in step 5, the secure control plane 204 binds the tokens and/or licenses to the proof of possession information for validation. For example, the CDN authorization tokens are bound to the authorization proof token so that client device 1 250-1 can then use the CDN authorization tokens bound to its client public key to request media from the CDN 206 and include an authorization proof token in the request to the CDN 206 in step 6. The CDN 206 with proof of possession protection can then validate that indeed the authorization token presented by client device 1 250-1 is issued to client device 1 250-1 making the media access request. In some embodiments, in the case of the media content being DRM protected, client device 1 uses the DRM authorization token bound to the client public key as part of the license request, so that the secure control plane 204 can validate that the DRM authorization token presented by client device 1 250-1 is issued to client device 1 250-1 making the DRM license request. In another example, in an access to media content request, the DRM license is bound with the DRM authorization token and the client public key so that the resource server can validate the request before providing the media content, e.g., checking the validity of the authorization token and the authorization proof token.

In FIG. 2B, a pirate 251-2 at client device 2 250-2 may obtain a copy of the authorization tokens from client device 1 250-1 in step 7 using methods as explained above with reference to FIG. 1. The pirate 251-2 may then attempt to use cloned CDN and/or DRM authorization tokens to request and obtain media content from the CDN 206. However, different from the system in FIG. 1, because the pirate 251-2 in the end-to-end secure content delivery system 200B cannot provide the server provisioned client authorization proof of possession when presenting the authorization tokens to the servers 204 and/or 206, the secure control plane 204 and/or the CDN 206 with proof of possession protection can block such requests from client device 2 250-2.

In particular, client device 2 250-2 cannot sign an authorization proof without the client private key that the security headend 205 provisioned for client device 1 250-1. Further, because the keys for client device 1 250-1 keys were securely produced in the security headend 205, e.g., in a secure environment that is unknown to the pirate 251-2, even using known attack techniques with random generators, the pirate 251-2 cannot replicate the server side key production process to generate a client private key that matches the client private key the security headend 205 provisioned for client device 1 250-1. Additionally, because client device 2 250-2 cannot produce a valid assertion object using a client public key of client device 2 250-2, the pirate 251-2 cannot request new authorization tokens from the secure control plane 204. As such, the secure control plane 204 and/or the CDN 206 with proof of possession protection would block any request to resources from client device 2 250-2, such as the requests for DRM licenses and/or content access.

FIG. 2C shows an example of a secure over-the-top (OTT) media delivery system 200C, in accordance with some embodiments. In FIG. 2C, the exemplary client device 250 includes a media player 203, an application 201 (e.g., one of the application(s) 201 as shown in FIG. 2A), and the security engine 202 as described above with reference to FIGS. 2A and 2B. In some embodiments, the media player 203 communicates with the CDN 206 with proof of possession protection to request media content.

In some embodiments, the application 201 (e.g., for presenting a user interface (UI)), coupled with the security engine 202 and the media player 203, communicates with the secure control plane 204 on the server side. In some embodiments, the application 201 activates the security engine 202, uses the security engine 202 for request signing (e.g., signing the requests using the keys provisioned by the security headend 205), participates in provisioning flows as described in further detail below, and instructs the media player 203 to play media content obtained from the CDN 206.

In some embodiments, the security engine 202 coordinates with the security headend 205 to provide proof of possession based on the keys (e.g., the keys 256 in FIG. 2A)

and to facilitate the time alignment, e.g., obtaining the client notion of real-world time 258 in FIG. 2A provisioned by the security headend 205. In some embodiments, the client device 205 is protected with software obfuscation and/or secure storage techniques as known in the art to protect the application 201 and other data stored in the non-transitory memory 254 (FIG. 2A).

In some embodiments, when the media player 203 requests media assets from the CDN 206, the security engine 202 intercepts the requests and adds the authorization proof token to the requests. In some embodiments, the security engine 202 further secures the requests with keys provided by the security headend 205. Further, in some embodiments, the security engine 202 adds an authorization proof token header to the request to facilitate the token binding, validation, and/or subsequent session token creation on the CDN 206.

In some embodiments, the secure control plane 204 authenticates and authorizes the client device 250 (e.g., via its communication with the application 201). In some embodiments, the secure control plane 204 also facilitates the initial provisioning flows for the security engine 202. In some embodiments, the secure control plane 204 is involved in validating that the assertion object includes the client public key provisioned for the client device 250 and is signed with the private key of the security headend 205. In some embodiments, the secure control plane 204 also directly ascertains the validity of the assertion object presented by the client device 250, e.g., by calling an application programming interface (API) provided by the security headend 205.

In some embodiments, the security headend 205 provides the security engine 202 with a secure client public and private key pair for demonstrating proof of possession as well as a secure notion of real-world time. In some embodiments, the security headend 205 also provides the security engine 202 with an assertion object, where the assertion object includes the provisioned client public key and is signed with the server private key for the security headend 205. In some embodiments, the security headend 205 further provides the security engine 202 with time alignment, e.g., as the security engine 202 periodically executes the heartbeat procedure. In some embodiments, the security headend 205 additionally provides an interface (e.g., an API) to the control plane 204 in the initial client provisioning flow, provides information elements used in initial provisioning, and/or provides another interface (e.g., another API) to the secure control plane 204. With the interface(s), the secure control plane 204 can conduct an introspection to directly ascertain the validity of an assertion object presented by the client device 250 in accordance with some embodiments.

In some embodiments, the CDN 206 provides media content to the media player 203, e.g., after validating access tokens and/or signatures attached to the proof of possession tokens, etc. Further, in some embodiments, the CDN 206 detects that an additional header is presented with a thumbprint of the client public key. The CDN 206 can then use the information in the additional header to validate the information during authorization and facilitate the session token production in accordance with some embodiments.

Figure 3:
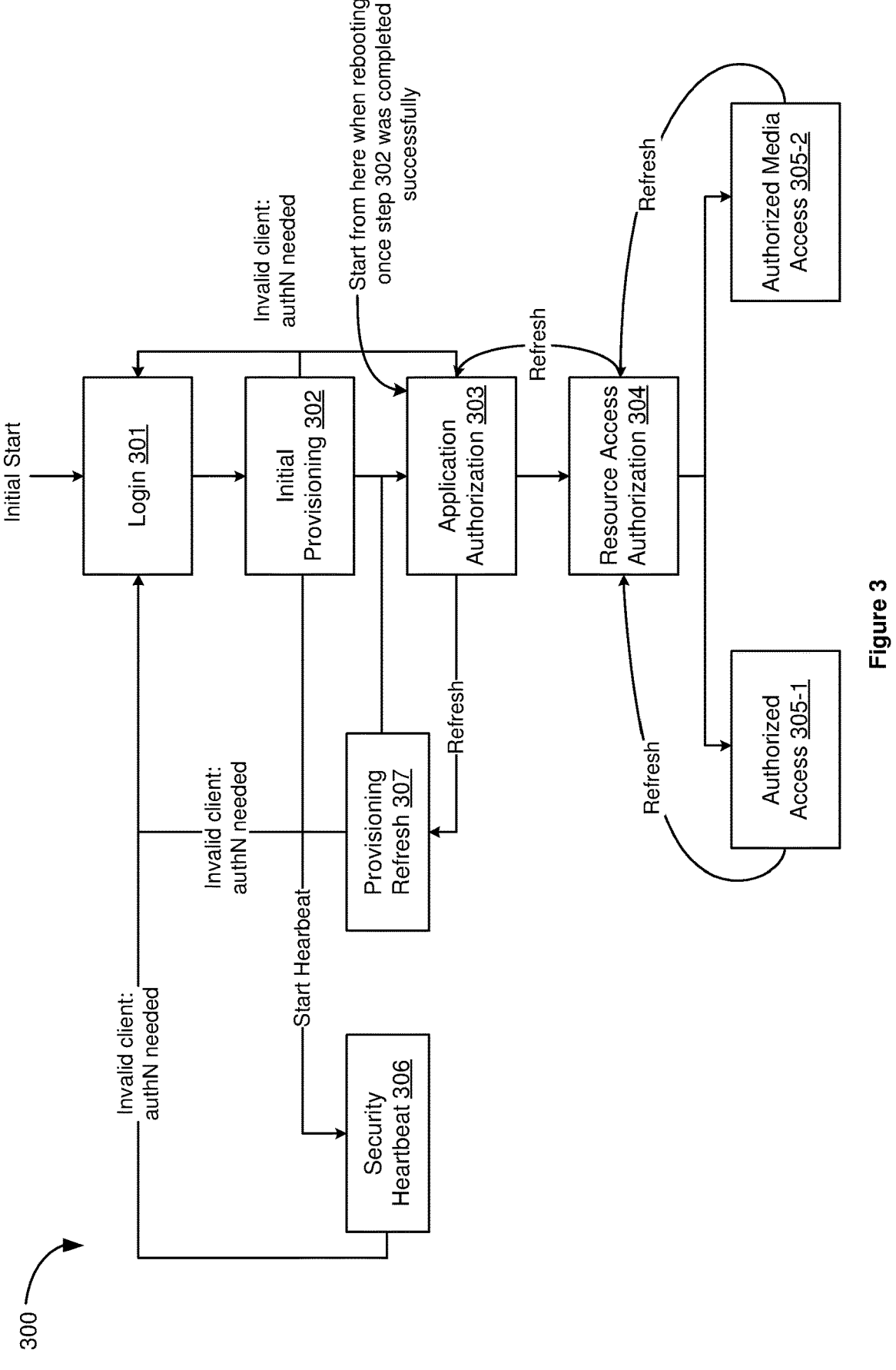
FIG. 3 is a flowchart illustrating the sequence and various states of server controlled client authorization proof of possession for secure authorization, in accordance with some embodiments.

FIG. 3 is a flowchart 300 illustrating various sequences and states (or phases) of server controlled client authorization proof of possession for secure authorization in accordance with some embodiments. In some embodiments, operations in the flowchart 300 are performed by an exemplary secure content delivery system as shown in FIGS. 2A-2C. The interactions between the client side and the server side within the exemplary secure content delivery system at various states are described in further detail below with reference to FIGS. 4, 5A-5C, 6-8, 9A-9B, and 10-11.

In some embodiments, the client device (e.g., the client device 250 in FIGS. 2A-2C) operates in a login state 301 to initiate the server controlled client authorization proof of possession operations. In the login state 301, the secure control plane (e.g., the secure control plane 204 in FIGS. 2A-2C) as a login authentication server authenticates credentials provided by a client. In some embodiments, the client provides the credentials out of band. The login state 301 is the initial state as well as the state the client device reverts to in the case of the security engine (e.g., the security engine 202 in FIGS. 2A-2C) or the application (e.g., the application 201 in FIGS. 2A and 2C) determining that the client security information (tokens and/or keys, etc.) has become invalid, e.g., not renewable by an automated process. The login state 301 is described in further detail below with reference to FIG. 4.

In some embodiments, upon successful authentication, the client device operates in an initial provisioning state 302. In the initial provisioning state 302, the security engine on the client device securely receives from the security headend (e.g., the security headend 205 in FIGS. 2A-2C) an initial set of client private and public keys, an assertion object that includes an expiration time for the keys, and an initial time alignment. The security engine stores the keys, the expiration time, and/or the time in the storage on the client device, e.g., in the non-transitory memory 254 in FIG. 2A. Also in the initial provisioning state 302, the security headend generates the keys, the assertion object, and the time alignment based on the information received in the login state 301 from the secure control plane. In some embodiments, a failure in the initial provisioning state 302 reverts the client device to the login state 301, e.g., the secure control plane requesting login information from the client device and/or requiring re-authentication of the client. The initial provisioning state 302 is described in further detail below with reference to FIGS. 5A-5C.

In some embodiments, following the initial provisioning state 302, the client device enters an application authorization state 303. In the application authorization state 303, the application on the client device uses the authorization grant received in the login state 301 to request an application authorization token for subsequent application control services. In some embodiments, the security engine on the client device generates an authorization proof token (e.g., a DPoP token) and includes the authorization proof token in the request. Further, in some embodiments, the request includes the assertion object provisioned by the security headend, so that the secure control plane acting as an application authorization server can ascertain that the client public key presented in the authorization proof token is indeed provisioned for the client device by the security headend. Alternatively, in some embodiments, the secure control plane queries the security headend to ascertain the validity of the assertion obtained from the security headend, e.g., sending a query for every request, for a random subset of the requests, and/or pursuant to a policy that takes into account the temporal information, the type of the client, the client network information, and/or the client geo location, etc.

In some embodiments, the secure control plane also provides a refresh authorization token as well as an expiration time of the access token. The refresh authorization token can be used when the authorization token is about to expire, e.g., the expiration time of the authorization token is within a threshold limit from the real-world time (e.g., the client notion of the real-world time and/or the server notion of the real-world time). In some embodiments, when the expiration for the server provisioned proof of possession information as provided in the assertion object obtained from the security headend is eminent, e.g., within the threshold limit from the real-world time, the client device enters a provisioning refresh state 307 to request new server provisioned proof of possession information. As shown in FIG. 3, the application authorization state 303 is the initial state of operation following a reboot of the client device once the client device completes the initiate provisioning state 302 successfully and securely persists the keys and the assertion object, e.g., storing the keys and the assertion object in the non-transitory memory 254 (FIG. 2A). In some embodiments, the client device uses secure store hardware (e.g., key chain and/or a secure section of the non-transitory memory) for persisting the keys and/or the assertion object. In some embodiments, the client device encrypts and stores the keys and/or the assertion object on file system(s) using hard-coded and/or obfuscated key(s). The application authorization state 303 is described in further detail below with reference to FIG. 6.

In some embodiments, following the application authorization state 303, the client device enters a resource access authorization state 304. In the resource access authorization state 304, the application on the client device uses the application authorization token received in the application authorization state 303 to obtain subsequent authorization tokens. The client device then uses subsequent authorization tokens against resource servers that are decoupled from the security headend, e.g., DRM systems and/or CDN systems, etc. Also in the resource access authorization state 304, the security engine on the client device generates an authorization proof token and includes the authorization proof token in various authorization requests. In some embodiments, when the application authorization token expires, the client device goes through a refresh flow to return to the application authorization state 303. The resource access authorization state 304 is described in further detail below with reference to FIG. 7.

In some embodiments, using the authorization tokens and the authorization proof token prepared in the resource access authorization state 304, the client device requests access to resource servers. In some embodiments, in an authorized access state 305-1, the application on the client device requests access to resource servers (e.g., the secure control plane) by presenting the authorization proof token and the authorization token. The authorized access state 305-1 is described in further detail below with reference to FIG. 8. In some other embodiments, in an authorized media access state 305-2, the media player (e.g., the media player 203 in FIG. 2C) sends a request that is intercepted by the security engine on the client device. In some embodiments, the security engine injects the authorization proof token as well as with an authorization proof token header that includes a thumbprint and/or hash of the client public key and attaches the authorization token to a request to resource servers such as CDNs. The injected information allows the CDNs to efficiently determine the binding state of the attached authorization token and produce a session token bound to the client public key, e.g., via the value of the authorization proof token header. The authorized media access state 305-2 is described in further detail below with reference to FIGS. 9A and 9B.

In some embodiments, the client device activates a security heartbeat state 306 (e.g., as a periodic activity) following the initial provisioning state 302, e.g., following a reboot and once the client device has persisted the keys, the assertion object, and/or a client notion of the real-world time, etc. In the security heartbeat state 306, the security engine 202 securely contacts the security headend to obtain the client notion of the real-world time and updates its persisted notion of the real-world time, e.g., to adjust or align the delta between the client notion stored on the client device and the real-world time from the security headend. In the security heartbeat state 306, the security headend in accordance with some embodiments also instructs the security engine on the client device to invalidate the security information (e.g., the server provisioned keys, etc.) persisted on the client device, thus reverting the client device to the login state 301. The security heartbeat state 306 is described in further detail below with reference to FIG. 11.

In some embodiments, in the provisioning refresh state 307, the security engine on the client device requests a new set of client keys, a new assertion object, and time alignment from the security headend. The provisioning refresh state 307 is different from the initial provisioning state 302 in that in the provisioning refresh state 307, the information the security engine presents to the security headend is based on previous provisioning. In some embodiments, the client device initiates the provisioning refresh process (e.g., from the application authorization state 303) when the expiration time set in the assertion object that accompanied the client keys is about to expire, e.g., within a threshold limit from the real-world time. The provisioning refresh state 307 is described in further detail below with reference to FIG. 10.

FIG. 4 is a sequence diagram 400 illustrating the login state 301 described in FIG. 3 in accordance with some embodiments. In the login state, the secure control plane 204 verifies the user identity and creates an initial secure association between the user, the application 201 on the client device, and the secure control plane 204. In some embodiments, in step 1, the application 201 presents the information to the secure control plane 204 so that the secure control plane 204 can validate the login and identify the user in step 2. A client is authenticated to the secure control plane 204 using any identity verification techniques, such as using credentials possessed by the user (e.g., a user name and a password and/or biometric information), sending a text code to a phone the user operating the client device, and/or using a third-party identity provider, etc.

Once the secure control plane 204 validates the login information, the secure control plane 204 generates a code and sends the code to the application 201 for subsequent usage in step 3. In some embodiments, the secure plane 204 also returns additional information for the application 201 to use in subsequent flows, such as a unique identifier used in the identification of a client device, e.g., an endpoint unique identifier (EUID). In some embodiments, the communication between the application 201 and the secure control plane 204 is protected using secure protocols, e.g., the application 201 sending the login credentials in step 1 and receiving the code in step 3 using transport layer security (TLS) as an encryption protocol.

In some embodiments, the code returned to the application 201 at the end of a successful login is associated with (e.g., bound to) one or more identifiers in the secure control plane 204. For example, the one or more identifiers can include a user identifier (ID or UID), which is an ID that uniquely identifies the subscriber, user, and/or account in the subscriber, user, and/or account management system on the secure control plane 204. In another example, the one or more identifiers include a specific instance of the login attempt, and/or a unique identifier associated with the client device (e.g., an EUID). The EUID can be generated by the secure control plane 204 in some embodiments. In some other embodiments, the application receives the EUID from the security engine (e.g., the security engine 202 in FIGS. 2A and 2B) and provides to the secure control plane 204 as part of the login attempt. In some embodiments, the one or more identifiers also include any other information that the secure control plane 204 would validate in the assertion object to be received in subsequent flows.

In some embodiments, the code is associated with other information, such as a unique code ID and/or an expiration time. The unique code ID allows for subsequent uniqueness checks of the code. The expiration time can be specified explicitly or implicitly, e.g., relying on the known issued time when processing the code in subsequent flows. In some embodiments, the association of the code to the one or more identifiers, the unique code ID, and/or the expiration time is intrinsic to the code, e.g., including the one or more identifiers, the unique code ID, and/or the expiration time in cookies. Conversely, in some other embodiments, the code is a pointer to a record with the one or more identifiers, the unique code ID, and/or the expiration time stored in a database on the secure control plane 204. In yet some other embodiments, the code includes a mixture of explicit specification of some elements intrinsic to the code and binding some other elements through a database record ID embedded in the code.

In some embodiments, the code is protected so that when presented in subsequent flows to the secure control plane 204, the secure control plane 204 can validate its authenticity. Various cryptographic operations can provide such protection, e.g., encryption, decryption, and/or signing with a digital signature, etc. In some embodiments, failures in completing the login with a successful outcome result in reverting back to the start of the login state.

Figure 5A:
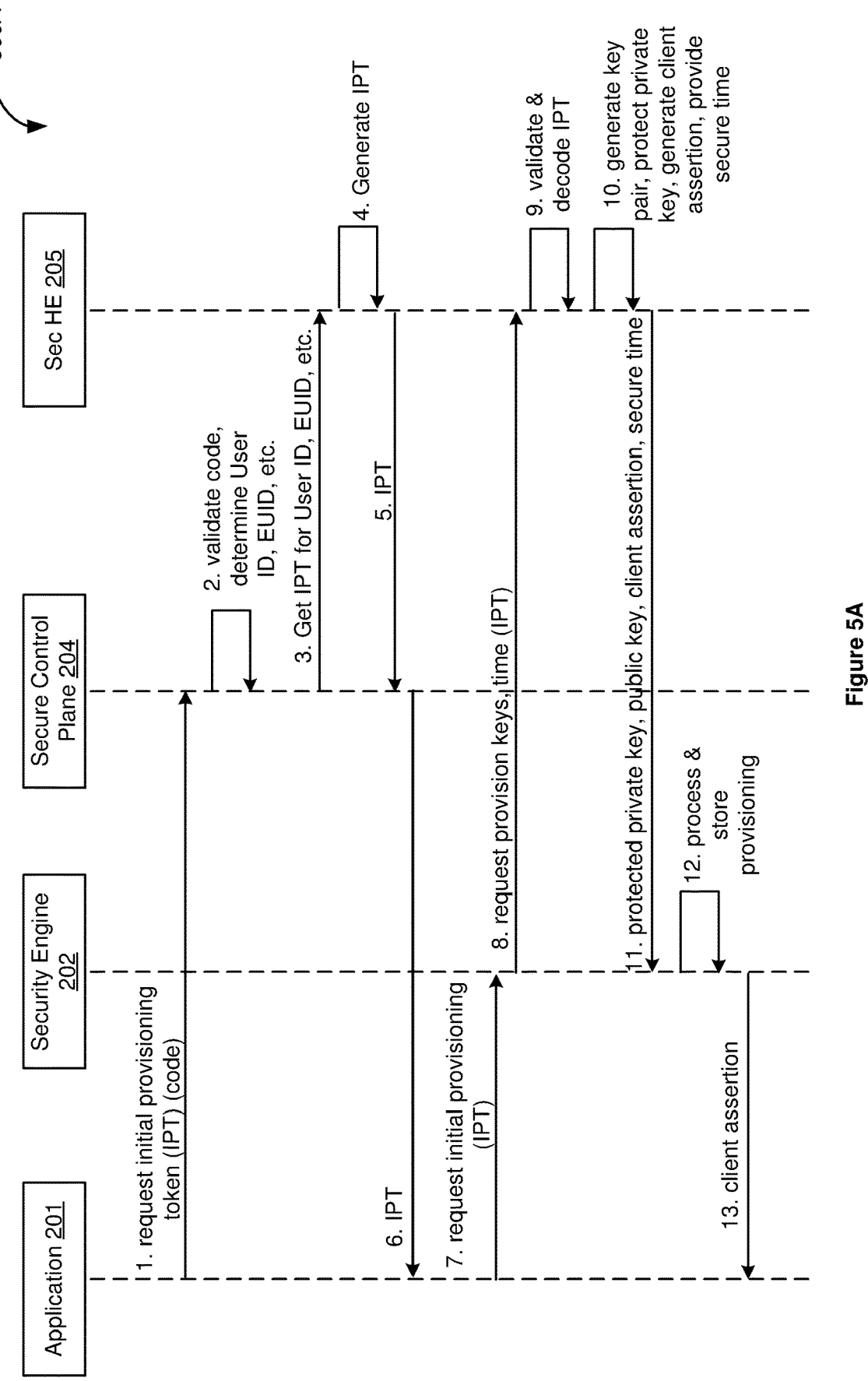

FIG. 5A is a sequence diagram 500A illustrating the initial provisioning state 302 in FIG. 3 in accordance with some embodiments. In the initial provisioning state, the security headend 202 securely provisions a first set of security elements that will be used in subsequent flows to secure the communication among the client device, the secure control plane 204, and the resource servers. In some embodiments, the first set of security elements includes a client public and private key pair, a secure notion of real-world time, a client assertion object, and any other initial provisioning for modifying the behaviors of the security engine 202, e.g., for controlling the level of error logging, etc. In some embodiments, the security engine 202 uses the key pair in subsequent cryptographic operations, e.g., for creating an authorization proof token. In some embodiments, during the initial provisioning, the communications among the client device, the secure control plane 204, and the security headend 205 (e.g., steps 1, 3, 5, 6, 8, and 11) are protected using secure protocols, e.g., using TLS as an encryption protocol.

In some embodiments, the initial provisioning starts with the application 201 on the client device requesting initial provisioning from the secure control plane 204 in step 1, e.g., by providing the code the application 201 received at the end of the login state described above with reference to FIG. 4. In some embodiments, the application 201 provides additional parameters along with the request, e.g., the EUID. In some embodiments, the secure control plane 204 validates various properties of the code in step 2. In some embodiments, validating such properties includes validating that the code is signed with a key known to the secure control plane 204, validating the format of the code and/or the expiration time of the code, validating that the same code has not been used more than a threshold number of times, validating that the code is associated with a valid user ID, validating that the combination of the user ID and the EUID has not been used more than a threshold number of times, and/or validating that the information bound to the code matches the additional information the application 201 has provided as part of the initial provisioning request. It should be noted that such validations can occur when the code embeds the properties and/or when the code points to database record(s) that hold the properties.

In step 3, the secure control plane 204 requests an initial provisioning token from the security headend 205 and provides the security headend 205 with one or more of the user ID and EUID. In some embodiments, the secure control plane 204 also includes any other item(s) in the request that the secure control plane 204 may receive in subsequent flows as part of the client assertion object for validation. In step 4, the security headend 205 generates an initial provisioning token (IPT) that includes the information provided by the secure control plane 204. In some embodiments, the initial provisioning token also includes a unique ID for the token, an expiration time for the token, and/or a purpose code of the token (e.g., initial provisioning of keys), etc. In some embodiments, the security headend 205 protects the initial provisioning token, e.g., by encrypting, decrypting, signing, and/or validating, etc. In step 5, the security headend 205 returns the initial provisioning token to the secure control plane 204, and the secure control plane 204 returns the initial provisioning token to the application 201 in step 6.

In step 7, the application 201 requests initial provisioning from the security engine 202 and provides the security engine 202 with the initial provisioning token. In some embodiments, the security engine 202 requests initial provisioning of keys, time, and an assertion object from the security headend 205 and presents the initial provisioning token in step 8. It should be noted that the steps shown in FIG. 5A are some embodiments of initiating the provisioning request. The secure system described herein may use other methods for requesting the initial provisioning and for receiving the server provisioned keys in place of or in conjunction with the embodiment described herein. For instance, some methods may have different flows, such that step 8 is preceded by another step, which presents the initial provisioning token, obtains some other code(s), and uses the additional code(s) to request the client keys for the first time. Such preliminary steps can be repeated multiple times in various embodiments until the initial provisioning is requested. In another example, instead of the client device initiating an explicit request, e.g., sending a request marked as "get provisioning keys", the server sends the keys to the client device as a response to a query that is not explicitly marked or as server-initiated messages (e.g., using websocket technology).

In step 9, the security headend 205 validates and decodes the initial provisioning token, e.g., validating the expiration time and/or the uniqueness of the initial provisioning token. Further, in step 10, upon validating and decoding the initial provisioning token, the security headend 205 generates a provisioning response message. In some embodiments, the provisioning response message includes a client public and private key pair, the server notion of real-world time from the security headend 205, and a client assertion object. In some embodiments, the provisioning response message also includes the periodic refresh interval for the security heartbeat.

In some embodiments, the client public key and the client private key are securely generated by the security headend 205 and protected, e.g., encrypted with a key that is hard coded in an obfuscated manner in the security engine 202. In some embodiments, the client assertion object is signed with a server private key of the security headend 205, where the corresponding server public key is known to the secure control plane 204. In some other embodiments, the client assertion object is signed with a key shared with the secure control plane 204. In some embodiments, the client assertion object includes the client public key from the server provisioned key pair and/or the corresponding hash or thumbprint, the information provided in the initial provisioning token (e.g., the user ID and/or the EUID), and/or an expiration time for the assertion object.

In step 11, the security headend 205 sends a secure provisioning response message to the security engine 202. In some embodiments, the security headend 205 protects the server provisioned client public key, client private key, client assertion object, and the time base using encryption and/or other cryptographic methods. For example, the response message can be encrypted using a key shared between the security headend 205 and the security engine 202 and/or signed with the server private key of the security headend 205.

In step 12, upon receiving the secure provisioning response message, the security engine 202 processes the secure message by decoding the secure message, extracting the server provisioned information, and validating that such information is indeed from the security headend 205. In particular, the security engine 202 aligns the client notion of real-world time with the server notion of real-world time from the security headend 205. Further, the security engine 202 decodes the client public and private key pair and prepares and securely persists the server provisioned data, e.g., using secure store software, hardware, firmware in combination with techniques such as encryption and/or obfuscation, etc. Further, in step 13, the security engine 202 returns the client assertion object to the application 201. In some embodiments, the client assertion object is signed by the server private key of the security headend 205 and includes the client public key (or a hash or thumbprint of the client public key) provisioned by the security headend 205.

As shown in FIG. 5A, once the initial provisioning is completed for the client device, the security engine 202 has the configuration required for generating authorization proof information in subsequent flows and refreshing the client keys as well as the client notion of real-world time. Further, once the initial provisioning is completed, the application 201 has the client assertion object that can be presented in subsequent flows. In some embodiments, failure to complete the steps in the initial provisioning state with a successful outcome results in reverting back to the login state as shown and described above with reference to FIGS. 3 and 4.

In some scenarios, standard validation for CDN media access relying on asymmetric cryptography (e.g., public and private key pairs) for signing and validating the signature of the tokens. For example, asymmetric cryptographic operations may not be available at edge computing facilities in some CDNs, where simpler symmetric cryptographic operations are offered, e.g., symmetric hash-based message authentication code (HMAC) signing and/or validation operations. In another example, some client devices with low capacity hardware cannot perform multiple asymmetric signing operations efficiently, e.g., not capable of issuing 2-3 media requests per second.

To maintain the value of the authorization proof token in preventing CDN access tokens and CDN session tokens from being cloned, in some embodiments, symmetric cryptographic operations are performed for signing and validation. In such embodiments, each client has a unique secret key for signing using a symmetric signing method (e.g., secure hashing algorithm (SHA)-256). When processing a symmetric authorization proof token (e.g., an authorization signed with a symmetric key), CDNs performing simpler symmetric cryptographic operations can retrieve the unique secret key of the client and validate the signature of the symmetric authorization proof token. As used herein, the symmetric authorization proof token is also referred to hereinafter as a symmetric DPoP (SDPoP) token.

In some embodiments, upon receiving a request from the client, the CDN validates the symmetric authorization proof token in the request. For example, the CDN can validate that the method matches that of the request. In another example, the CDN can validate that the Uniform Resource Identifier (URI) matches that of the request. In still another example, the CDN can validate that the symmetric authorization proof token issue time is within the acceptable time difference from the current time, e.g., within a threshold from the expiration time. Optionally, in some embodiments, the CDN validates that the symmetric authorization proof token has not been processed before, e.g., based on a unique token identifier. In yet another example, the CDN validates that the symmetric authorization proof token is bound to the CDN access token and/or session token, e.g., by having a value in the token that is also uniquely present in the CDN access and/or session token. In some embodiments, the value is the hash of a standard public key associated with the client and presents in the SDPoP token as well as in the CDN access and/or session token. This allows the control plane to generate a CDN access token in the same way regardless of whether the client will use DPoP or SDPoP. The symmetric signing and validation method has different variants in accordance with various embodiments as shown in FIGS. 5B and 5C.

Figure 5B:
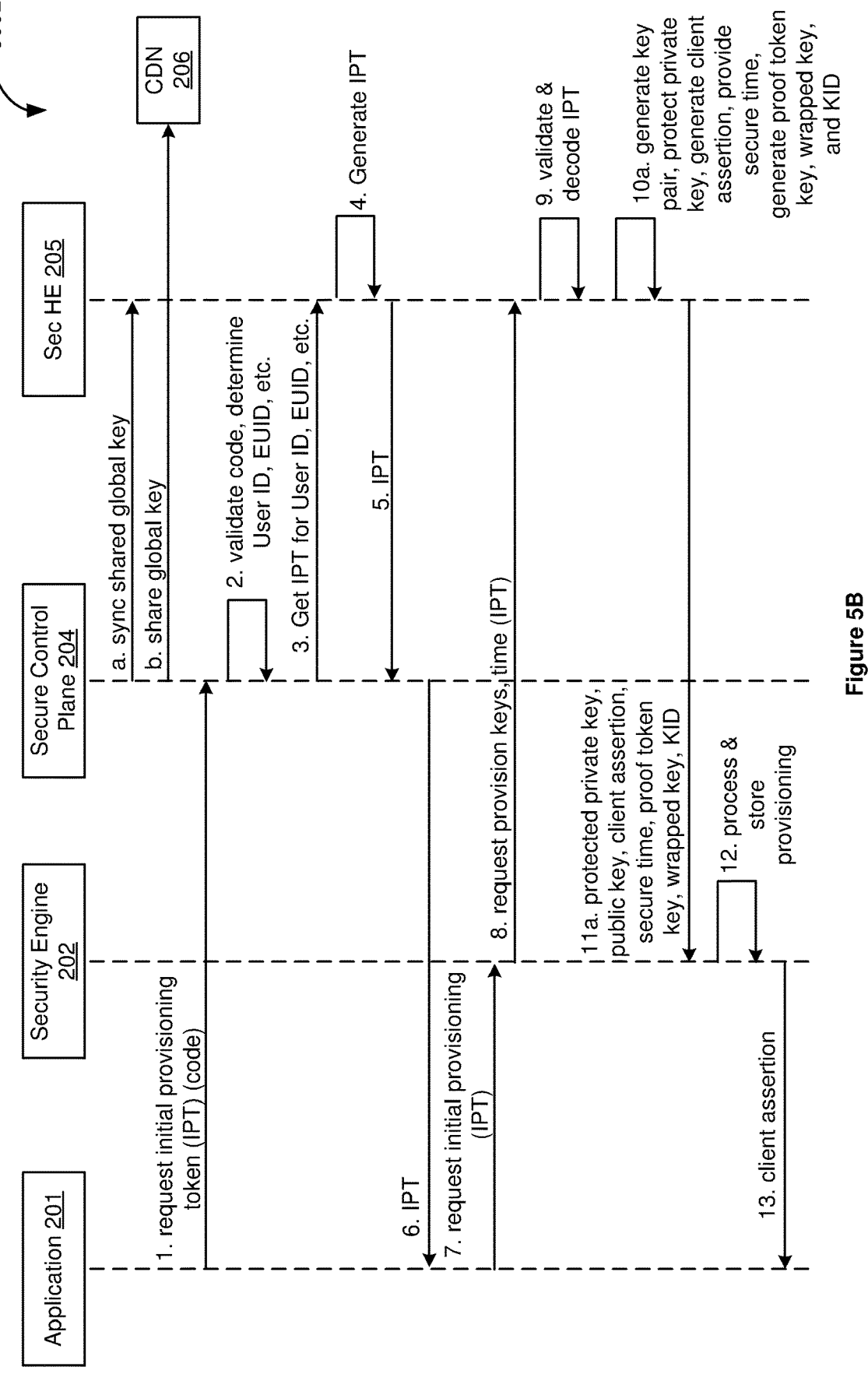
Figure 5C:
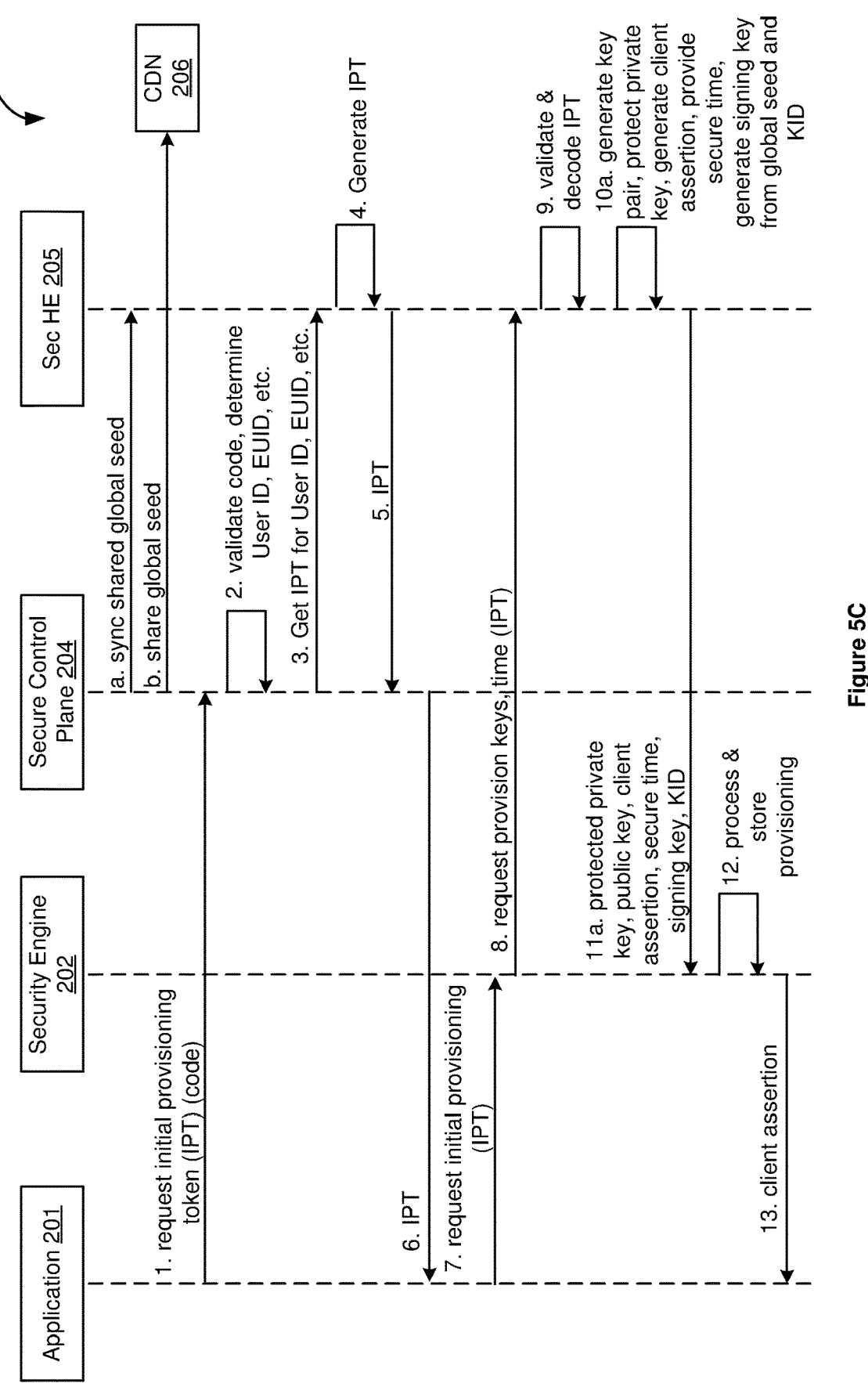

FIG. 5B is a sequence diagram 500B illustrating one embodiment of symmetric key provisioning during the initial provisioning state 302 (FIG. 3). The sequence diagram 500B is similar to and adapted from the sequence diagram 500A shown in FIG. 5A. Elements common to FIGS. 5A and 5B include common step numbers, and the differences between FIGS. 5A and 5B are described herein for the sake of brevity. To that end, in some embodiments, before the application 201 performs step 1 to request the initial provisioning token, the security control plane 204 synchronizes a shared secret key (SSK) (also known as the shared global key) with the security headend 205 in step a, and the secure control plane 204 then shares the synchronized shared secret key with the CDN 206 in step b. The shared secret key is thus shared between the security headend 205 and the CDN 206 but not shared with the client. Using the shared secret key, the security headend 205 can encrypt the unique key of a particular client security engine 202 and create an object that can be safely shared in the open with the CDN 206 within a media request from the media player on the client device.

In reference to the sequence of operations, steps 10a and 11a in FIG. 5B are variants of steps 10 and 11 in FIG. 5A in accordance with some embodiments. In step 10a, while the security headend 205 provisions for the security engine 202 the public and private key pair, the client assertion object, and the secure time base, the security headend 205 also generates a unique signing key for symmetric signing operations (also referred to hereinafter as a proof token key) and a wrapped key, which is the unique signing key encrypted with the shared secret key shared between the security headend 205 and the CDN 206 in step b. In some embodiments, the encryption uses a symmetric encryption method (e.g., AES-256). In some embodiments, in step 10a, the security headend 205 also generates a key identifier (KID) of the shared secret key. In step 11a, when the security headend 205 sends a secure provisioning response message to the security engine 202, which includes the unique signing key, the wrapped key, and the KID.

The key wrapping method as shown in FIG. 5B allows the CDN 206 to determine the key without accessing a database, thus supporting stateless rapid processing at the edge. It further allows the key generation method to be secretive within the security headend 205. However, some CDNs may have limited edge processing capability, e.g., too limited to support even symmetric encryption and/or decryption operations. Moreover, some edge processing does not support standard symmetric encryption and/or decryption operations and does not have the CPU resources for performing such operations in the edge environment. In such constrained computing environments, a more efficient key derivation method is described in further detail below with reference to FIG. 5C in place of the key wrapping method.

FIG. 5C is a sequence diagram 500C illustrating one embodiment of symmetric key provisioning during the initial provisioning state 302 (FIG. 3). The sequence diagram 500C is similar to and adapted from the sequence diagram 500A shown in FIG. 5A. Elements common to FIGS. 5A and 5C include common step numbers, and the differences between FIGS. 5A and 5C are described herein for the sake of brevity. To that end, in some embodiments, before the application 201 performs step 1 to request the initial provisioning token, the security control plane 204 synchronizes a shared secret seed (SSS) (also known as the shared global seed) with the security headend 205 in step a, and the secure control plane 204 then shares the synchronized shared secret seed with the CDN 206 in step b. The shared secret seed is thus shared between the security headend 205 and the CDN 206 but not shared with the client. Using the shared secret seed, both the security headend 205 and the CDN 206 can derive the unique secret key used by a particular client security engine 202 without exposing the unique client key.

In reference to the sequence of operations, steps 10a and 11a in FIG. 5C are variants of steps 10 and 11 in FIG. 5A in accordance with some embodiments. In step 10a, while the security headend 205 provisions for the security engine 202 the public and private key pair, the client assertion object, and the secure time base, the security headend 205 also generates a unique signing key for symmetric signing operations that is derived from the shared secret seed obtained in step b. For example, the unique signing key can be the SHA-256 HMAC of the shared secret seed with the public key created for the client in the same step 10a. In some embodiments, in step 10a, the security headend 205 also generates a KID of the shared secret seed. In step 11a, the security headend 205 sends a secure provisioning response message to the security engine 202, which includes the unique signing key and the KID.

Similar to the key wrapping method shown in FIG. 5B, the key derivation method as shown in FIG. 5C allows the CDN 206 to determine the key without accessing a database, thus supporting stateless rapid processing at the edge. Different from the key wrapping method shown in FIG. 5B, because the key derivation method is deterministic and requires less from the execution environment, the key derivation method as shown in FIG. 5C allows the key determination method to fit within the processing constraints of some CDNs.

In both the key wrapping and key derivation methods described above, there is secret information shared between the security headend 205 and the CDN 206. In some CDNs, the edge processing is incapable of accessing external configuration or data source when deployed, necessitating that the shared secret be hardcoded into the edge node. This potentially exposes the secret and complicates changing the secret. As such, to enhance the security of the symmetric signing and validation system, in some embodiments, a secret provisioning system is deployed to periodically create a new secret with a new KID (e.g., the shared global key in FIG. 5B of the shared global seed in FIG. 5C), generate a CDN edge execution package from a template file, add the new shared secret and its KID to the new template, and/or delete the old KID and the old secret. The new CDN edge execution package is then deployed to the CDN 206 and the security headend 205 retires the old secret upon provisioning the new secret. Using such key rotation scheme described above, in some embodiments, the secret provisioning system retains in the CDN 206 the old KID and the old secrets for as long as possible to allow for requests signed with the old key to be serviced until the new key is in use.

It should be noted that the key wrapping method and the key derivation method described in FIGS. 5B and 5C are exemplary key provisioning methods in symmetric signing and validation systems. Other methods can be used in place of or in conjunction with the methods described with reference to FIGS. 5B and 5C. For example, the CDN 206 can use a database for storing secret keys the security headend 205 provisioned for each client. When processing a client request, such CDNs 206 use the client ID, e.g., provided in the request, to lookup the symmetric signing key used by the client in the database. Upon locating the symmetric signing key in the database, such CDNs 206 retrieve the key from the database and use the key to decode the token.

Figure 6:
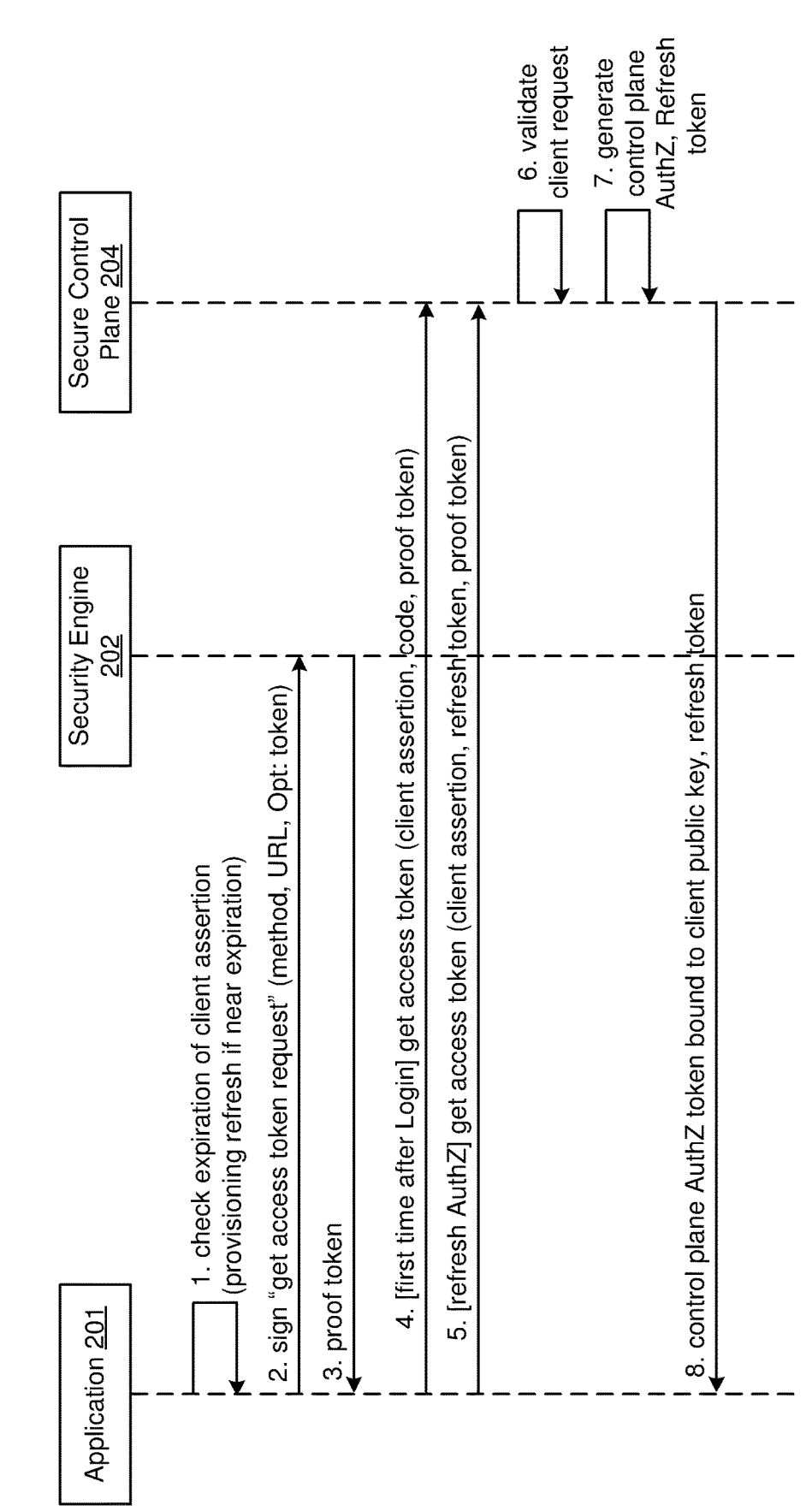

FIG. 6 is a sequence diagram 600 illustrating the application authorization state 303 in FIG. 3 in accordance with some embodiments. In some embodiments, the application 201 checks the expiration time of the client assertion object in step 1. In some embodiments, upon determining that the client assertion object is close to expiration, the client device enters the provisioning refresh state as will be described in further detail with reference to FIG. 10. Upon determining that the client assertion object is not close to expiration, in step 2, the application 201 requests the security engine 202 to provide an authorization proof token for signing a pending request of an application authorization token from the secure control plane 204. The application 201 provides the URL and the method for accessing the server in the pending request. In some embodiments, in the case of the intended request including an authorization token, the application 201 also provides the authorization token.

In step 3, the security engine 202 uses the client public and private key pair provisioned by the server and the client notion of real-world time to generate an authorization proof token. In step 4, for the first application authorization token request after the login state, the application 201 requests the secure control plane 204 to provide an initial application authorization and refresh token. In some embodiments, the request includes the code received by the application 201 in the login state as described above with reference to FIG. 4, the client assertion object provisioned by the security headend 205 (e.g., the client assertion object signed with the server private key of the security headend 205 and including the client public key as well as other information such as the user ID, etc.), and the authorization proof token (or the authorization proof token header) as generated in step 3. In step 5, for a subsequent application authorization token request, the application 201 requests a new application authorization and refresh token from the secure control plane 204. In some embodiments, in the request to the secure control plane 204, the application 201 includes the refresh token received by the application 201 in the previous run of the application authorization request, the client assertion object provisioned by the security headend, and the authorization proof token (or the authorization proof token header) as generated in step 3.

In step 6, the secure control plane 204 validates the request, e.g., validating the code and/or the client assertion object. For example, the secure control plane 204 can validate that the validity of the code (e.g., not expired) and/or validate that the code applies to a valid user ID, etc. In another example, the secure control plane 204 can use a server public key of the security headend that the security headend shares with the secure control plane 204 to validate that the client assertion object is signed by the security headend. In some embodiments, the secure control plane 204 validates that the client public key (or a client public key thumbprint or hash) in the assertion object matches the client public key provided by the security engine 202. In yet another example, the secure control plane 204 validates other content of the client assertion object (e.g., the user ID) matches expected values (e.g., the identifiers bound to the code) and/or other properties of the client assertion object (e.g., the client assertion object has not expired, etc.). In some embodiments, the secure control plane 204 queries the security headend by providing the security headend with the assertion object and asking for verification by the security headend that the assertion object is produced by the security headend.

Upon validating the client request, in step 7, the secure control plane 204 generates an authorization and refresh token and binds the authorization and refresh token to the client public key in the authorization proof token generated by the security engine 202. In step 8, the secure control plane 204 sends the authorization and refresh token to the application 201 for subsequent use. In some embodiments, during the application authorization, the communications between the client device and the secure control plane 204 (e.g., steps 4, 5, and 8) are protected using secure protocols such as TLS.

As shown in FIG. 6, when the client assertion object is not close to its expiration, once the application authorization is completed, the application 201 is in possession of a valid authorization token for accessing the secure control plane 204 services, a valid refresh token for refreshing the authorization token as well as the client public and private key pair. Failures in completing the steps shown in FIG. 6 result in reverting back to the login state shown in FIG. 4.

Figure 7:
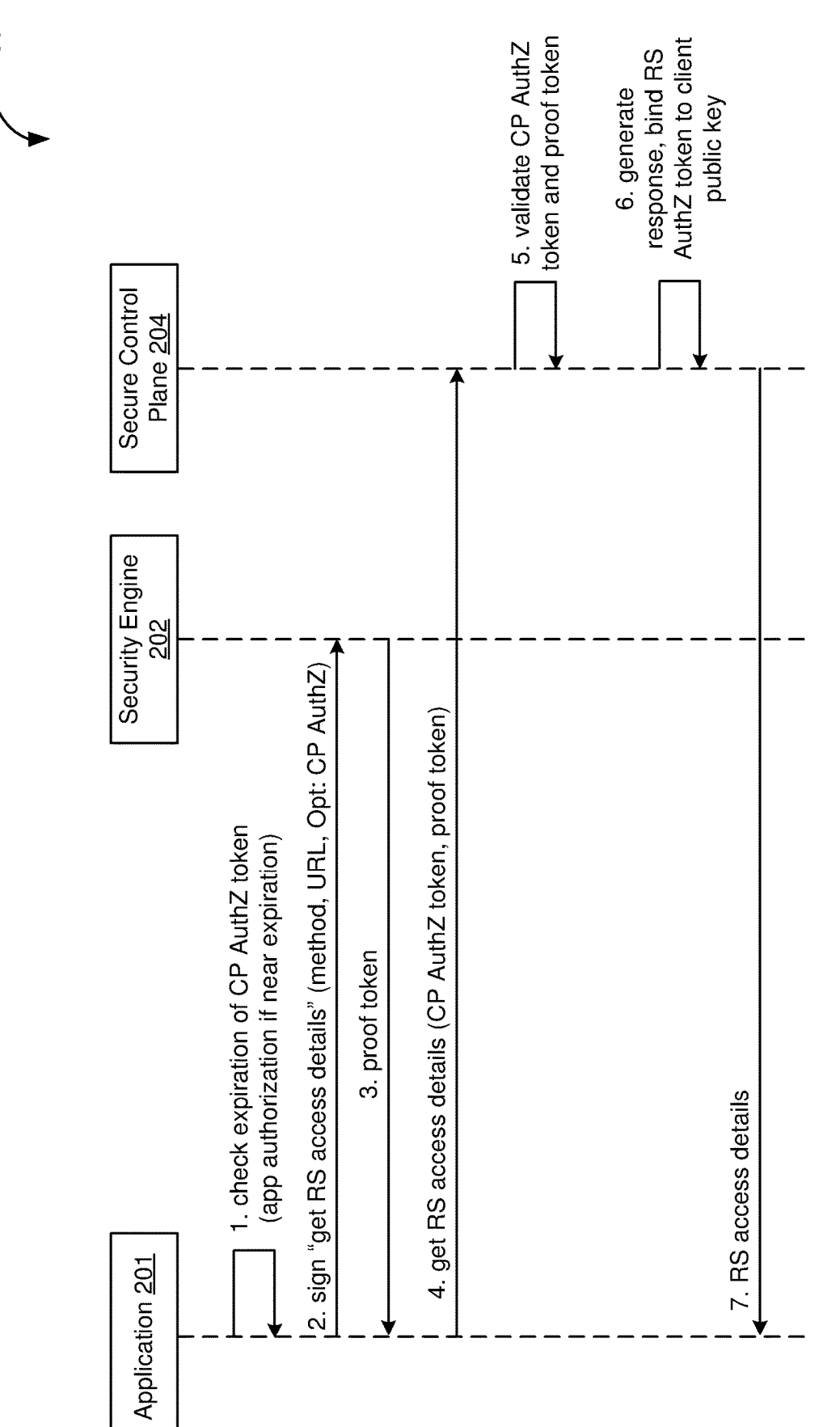

FIG. 7 is a sequence diagram 700 illustrating the resource access authorization state 304 in FIG. 3 in accordance with some embodiments. In the resource access authorization state, the application 201 receives authorization tokens to resource services other than the secure control plane 204, where the resource services do not share certain information with the security headend and may not be aware of the specifics of the client assertion object. In some embodiments, the client device enters the resource access authorization state each time a play catalog is displayed to the user with links to different media assets or when the resource server access fails and requires a refresh of the resource server access details. At the end of the resource access authorization state, the application 201 has the authorization token(s) to access resources on various resource servers, where the authorization token(s) are bound to the client public key in accordance with some embodiments. Failures in completing the steps in the resource access authorization state result in reverting back to the application authorization state as described above and shown in FIG. 6.

In step 1 of the resource access authorization state 304, the application 201 checks if the control plane authorization token is about to expire. In some embodiments, the client device reverts to the application authorization state shown in FIG. 6 for the control plane authorization token refresh when the application 201 receives an error from the secure control plane 204 indicating that the control plane authorization token has expired or is close to expiration. Having determined that the time-to-live value of the control plane authorization token is sufficient, e.g., not within a threshold from the expiration time, in step 2, the application 201 requests the security engine 202 to provide an authorization proof token for a pending request of resource access details from the secure control plane 204. In some embodiments, the application 201 includes in the request the URL and the method for accessing a particular resource server and optionally the control plane authorization token in some embodiments. In response to the request, the security engine 202 uses the client public and private key pair and the client notion of real-world time to generate an authorization proof token in step 3.

In step 4, the application 201 requests the access details for a resource server by providing the control plane authorization token and the authorization proof token. In step 5, the secure control plane 204 validates the request, e.g., checking the validity of the authorization token, the authorization proof token, and the binding between the two. In step 6, upon validating the request, the secure control plane 204 generates the authorization access token(s) for accessing the particular resource server and binds the authorization access token(s) to the client public key in the authorization proof token received in step 4. In some embodiments, the secure control plane 204 also adds additional access details for the application 201 to access the media assets, e.g., a list of media manifest URLs combined with the authorization access tokens. In step 7, the secure control plane 204 sends the resource server access details to the application 201. In some embodiments, during the resource access authorization, the communications between the client device and the secure control plane 204 (e.g., steps 4 and 7) are protected using secure protocols, e.g., TLS.

Figure 8:
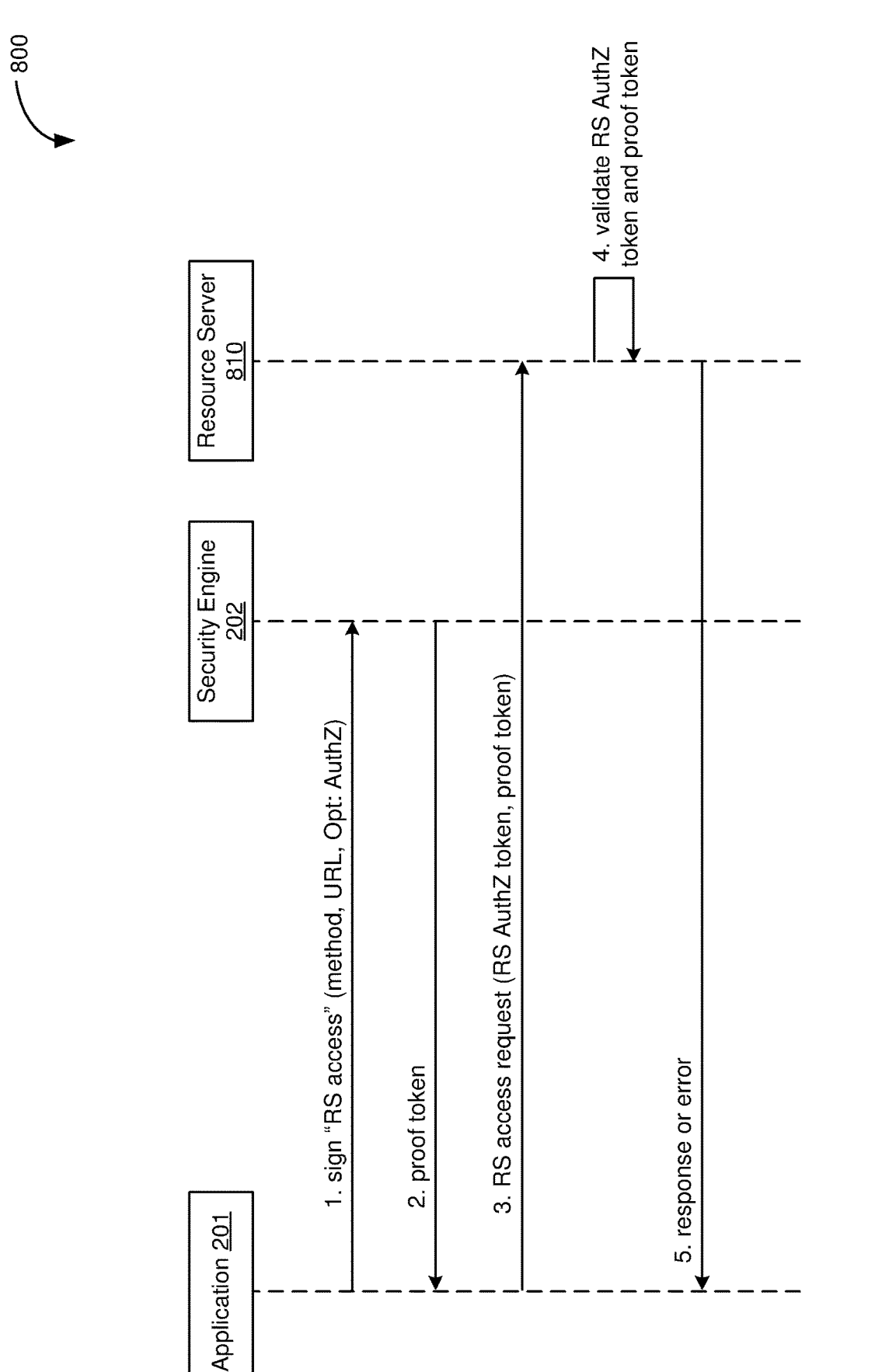

FIG. 8 is a sequence diagram 800 illustrating the authorized access state 305-1 in FIG. 3 in accordance with some embodiments. In the authorized access state 305-1, the application 201 uses protected authorization to access a third-party system, such as a DRM system. In particular, the application 201 securely accesses resources on resource servers by providing proof of possession, e.g., presenting the authorization proof tokens. In some embodiments, the media player on the client device accesses resources on resource servers such as CDNs without changes to the media player with enhanced security, e.g., by using the authorization proof token for the authorization and session tokens.

In step 1 of the authorized access state, the application 201 requests the security engine 202 to provide an authorization proof token for a pending request to access resources from a resource server 810. The request includes the URL and the method used for accessing the resource server 810. In some embodiments, the request optionally includes the authorization token for accessing the resource server 810, where the authorization token establishes bindings to the authorization proof token. In step 2, the security engine 202 uses the client public and private key pair and the client notion of real-world time to generate an authorization proof token and sends the authorization proof token to the application 201. In step 3, the application 201 sends an access request to the resource server 810, where the access request includes the access authorization token and the authorization proof token. In step 4, the resource server 810 validates the request, e.g., by checking the validity of the resource authorization token, the authorization proof token, and the binding between the two. In step 5, the resource server 810 sends a response to the application 201, e.g., a resource such as a file, or a reply to an application program interface (API) call upon a successful validation. In some embodiments, the resource server 810 sends an error upon a failed validation. In the case of a failed validation, the client device reverts to the resource access authorization state as shown in FIG. 7 to refresh its notion of the resource server access details.

Figure 9A:
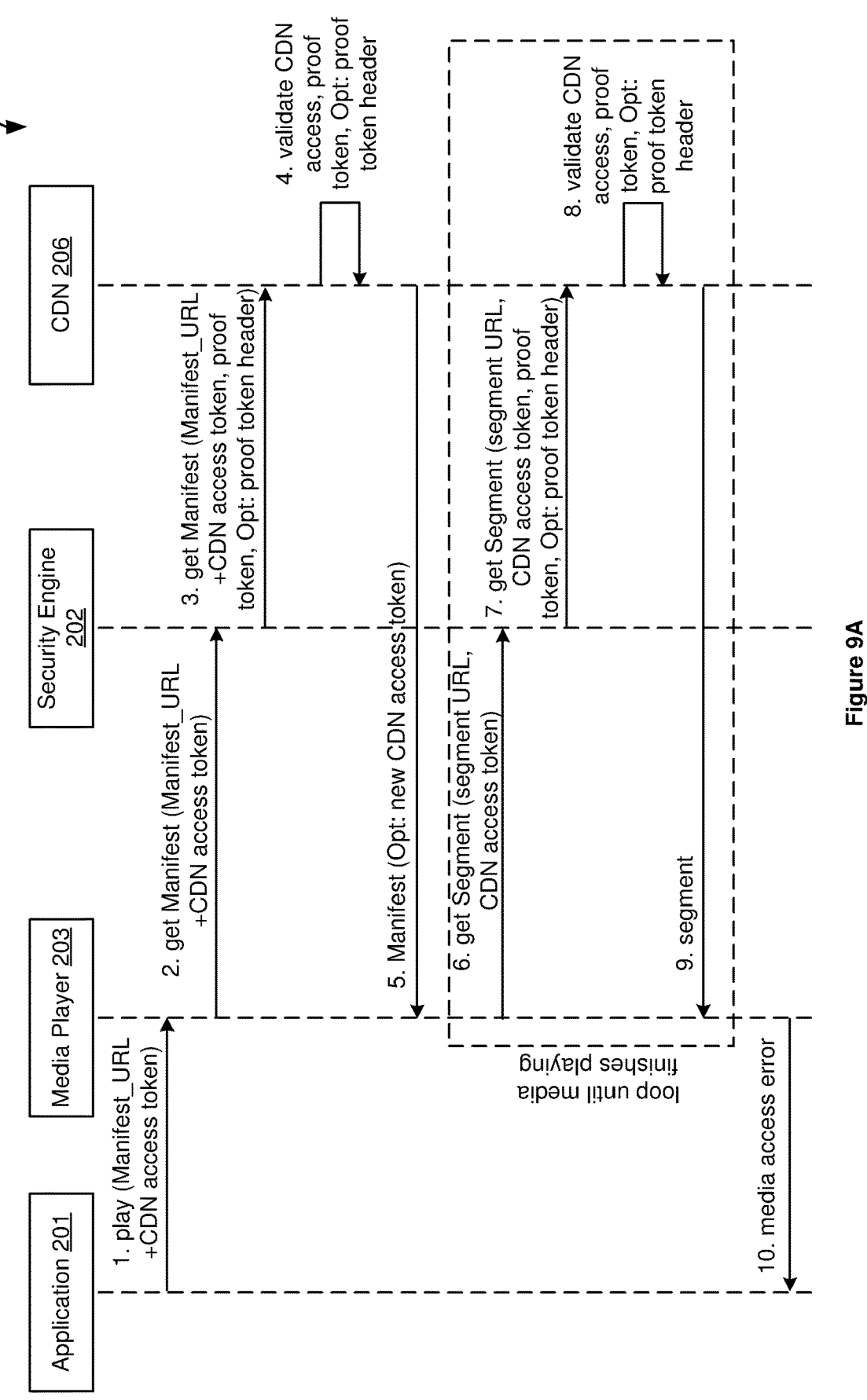

FIG. 9A is a sequence diagram 900A illustrating the authorized media access state 305-2 in FIG. 3, e.g., accessing media from the CDN 206, in accordance with some embodiments. In step 1, the application 201 instructs the media player 203 to start playing a media asset. In some embodiments, the instruction includes a URL to the media manifest file on the CDN 206 and the CDN authorization token obtained from the secure control plane. In some embodiments, when the media player 203 makes a request to the CDN 206 for the manifest, in step 2, the security engine 202 intercepts the request before the request is sent over the network to the CDN 206. In some embodiments, the media player 203 provides interception filters or plug-ins for the request interception. In some other embodiments, the application 201 changes the manifest URL to point to a local host IP address where the security engine 202 implements a web proxy for the request interception.

In step 3, the security engine 202 computes an authorization proof token for the intercepted request and injects the authorization proof token into the request. In some embodiments, the security engine 202 also injects an authorization proof token header (e.g., a DPoP-CNF header) and provides the hash or thumbprint of the client public key. Further, in some embodiments, the security engine 202 obtains the CDN authorization token, e.g., from the request URL or a cookie header and/or based on a text search for the appropriate field names such as "accesstoken=*;".

In step 4, the CDN 206 validates the CDN access token and the authorization proof token header. In some embodiments, when the CDN 206 is protected with authorization proof, the CDN 206 uses the client public key in the authorization proof token header to validate the binding to the CDN access token. The binding validation is a preliminary step to the more computationally intensive tasks such as decoding the authorization proof token and validating the binding to the public key within the authorization proof token in accordance with some embodiments.

In step 5, the CDN 206 returns the manifest file to the media player 203. In some embodiments, the CDN 206 computes a new CDN access token and a session token to return to the media player 203 (e.g., in a cookie header). The media player 203 can then use the CDN access token and the session token in subsequent requests for files referenced by the media manifest. In some embodiments, the CDN 206 uses the value of an HTTP header as described in step 3 to compute the secret for validating the new CDN access and/or session token. In some embodiments, the value carried in the authorization proof token header is part of the secret, thus binding the new token(s) to the client public key without requiring the CDN 206 to change the format of the session token or the method of producing the session token.

In some embodiments, steps 6-9 are repeated for requesting segments of the media asset until the media asset finishes playing. In step 6, the media player 203 generates request(s) to the CDN 206 for segment(s) and/or file(s) pointed by the manifest. Each request is intercepted by the security engine 202, e.g., using the same mechanism as in step 2. In step 7, as in step 3, for each request intercepted by the security engine 202, the security engine 202 generates an authorization proof token and injects the authorization proof token into the request. In some embodiments, the security engine 202 optionally injects the authorization proof token header prior to sending the request to the CDN 206. In step 8, the CDN validates the CDN access token. In some embodiments, the CDN 206 validates the CDN access token via the authorization proof token header binding and/or the authorization proof token and the binding of the authorization proof token to the CDN authorization token, which is the new session token as generated in step 5. In step 9, the CDN 206 returns the segment and/or the file to the media player 203, and the media player 203 renders the segment and/or the file as received and continues to make requests until the manifest is completed.

In some embodiments, in case of failing to access the media asset from the CDN 206, e.g., a validation error in step 4 or step 8, the CDN 206 returns an error response at the beginning of the loop, e.g., in step 5, or at the end of the loop, e.g., in step 9. In such embodiments, the media player 203 reports an access error message to the application 201. In some embodiments, upon receiving the access error reporting, the application 201 goes back to the resource access authorization state as shown in FIG. 7 to refresh the CDN access details. In some embodiments, CDN authorization failures in completing the steps in FIG. 9A result in reverting back to the resource access authorization step as shown in FIG. 7.

Figure 9B:
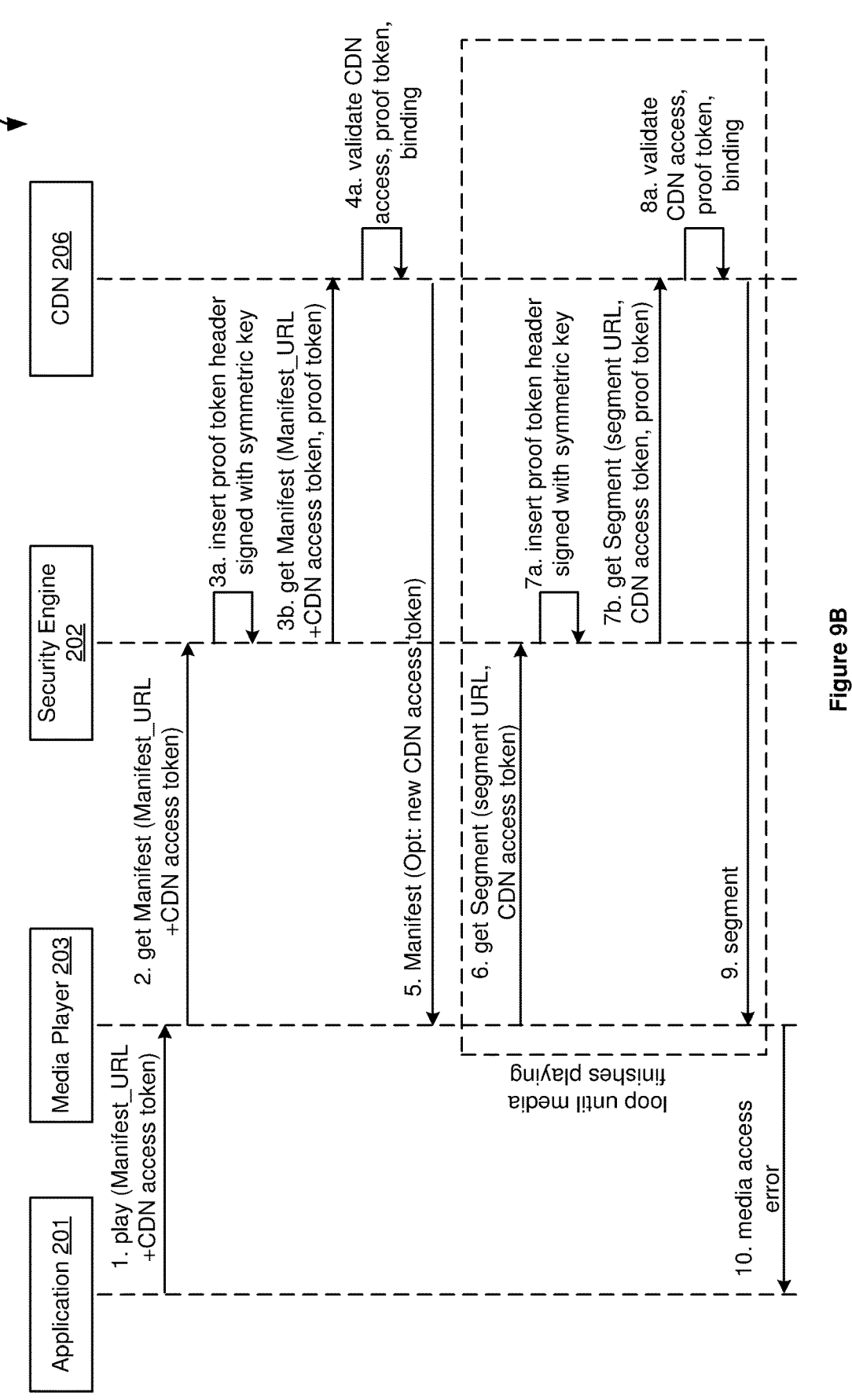

FIG. 9B is a sequence diagram 900B illustrating one embodiment of using symmetric key in the authorized media access state 305-2 in FIG. 3. The sequence diagram 900B is similar to and adapted from the sequence diagram 900A shown in FIG. 9A. Elements common to FIGS. 9A and 9B include common step numbers, and the differences between FIGS. 9A and 9B are described herein for the sake of brevity. To that end, in some embodiments, the security engine 202 adds a proof token header to each media request made by the client, including adding the proof token header to both the manifest request and the segment request to the CDN 206. For instance, after the manifest request was intercepted in step 2, the security engine 202 inserts a proof token header (e.g., an SDPoP header) that is signed with the symmetric key provisioned by the security headend to the manifest request in step 3a before the request is sent to the CDN 206 in step 3b. Likewise, after the request for a segment was intercepted in step 6, the security engine 202 inserts a proof token header (e.g., SDPoP header) that is signed with the symmetric key provisioned by the security headend to the segment request in step 7a before the request is sent to the CDN 206 in step 7b.

In some embodiments, the proof token header includes a header section, a payload section, and a signature of the security engine 202 with the client unique secret key. In some embodiments, the payload section includes the request method (e.g., GET method), the request URI, the timestamp the token was issued, a unique identifier for the token, and a conformation of the client public key to be compared with the one bound to the CDN access and session tokens. The header section can include various items depending on the method used for provisioning the client secret key. For instance, using the key wrapping method as described above with reference to FIG. 5B, in some embodiments, the header section includes a token type (e.g., SDPoP, etc.), the specification of the symmetric signing method (e.g., "HS256" indicating SHA-256 cryptographic hash function), the wrapped client key (e.g., the wrapped key generated in step 10a of FIG. 5B), the KID of the shared secret key (e.g., the KID generated in step 10a of FIG. 5B). In another example, using the key derivation method as described above with reference to FIG. 5C, in some embodiments, the header section includes the token type (e.g., SDPoP, etc.), the specification of the symmetric signing method (e.g., "HS256" indicating SHA-256 cryptographic hash function), and the KID of the shared secret seed (e.g., the KID generated in step 10a of FIG. 5C).

Upon receiving the request, in step 8a, the CDN 206 processes the access and session tokens in the request in accordance with some embodiments. In some embodiments, the CDN 206 also determines the value of the client unique secret key. For instance, when the CDN 206 determines that the request includes a wrapped key, e.g., based on the information in the proof token header, the CDN 206 decrypts the proof token header using the secret key shared with the security headend 205 and uses the KID to select a specific shared secret key from a possible set (e.g., provided in support of the shared secret key rotation processes). In another example, when the CDN 206 determines that the request includes a shared secret seed identifier, e.g., based on the information in the proof token header, the CDN 206 derives the client unique secret key using the secret seed shared with the security headend 205 and uses the KID to select a specific shared secret seed from a possible set (e.g., provided in support of the shared secret seed rotation processes). The CDN 206 then applies the same key derivation method as used by the security headend 205 (e.g., SHA-256 HMAC of the shared secret seed with the public key).

Figure 10:
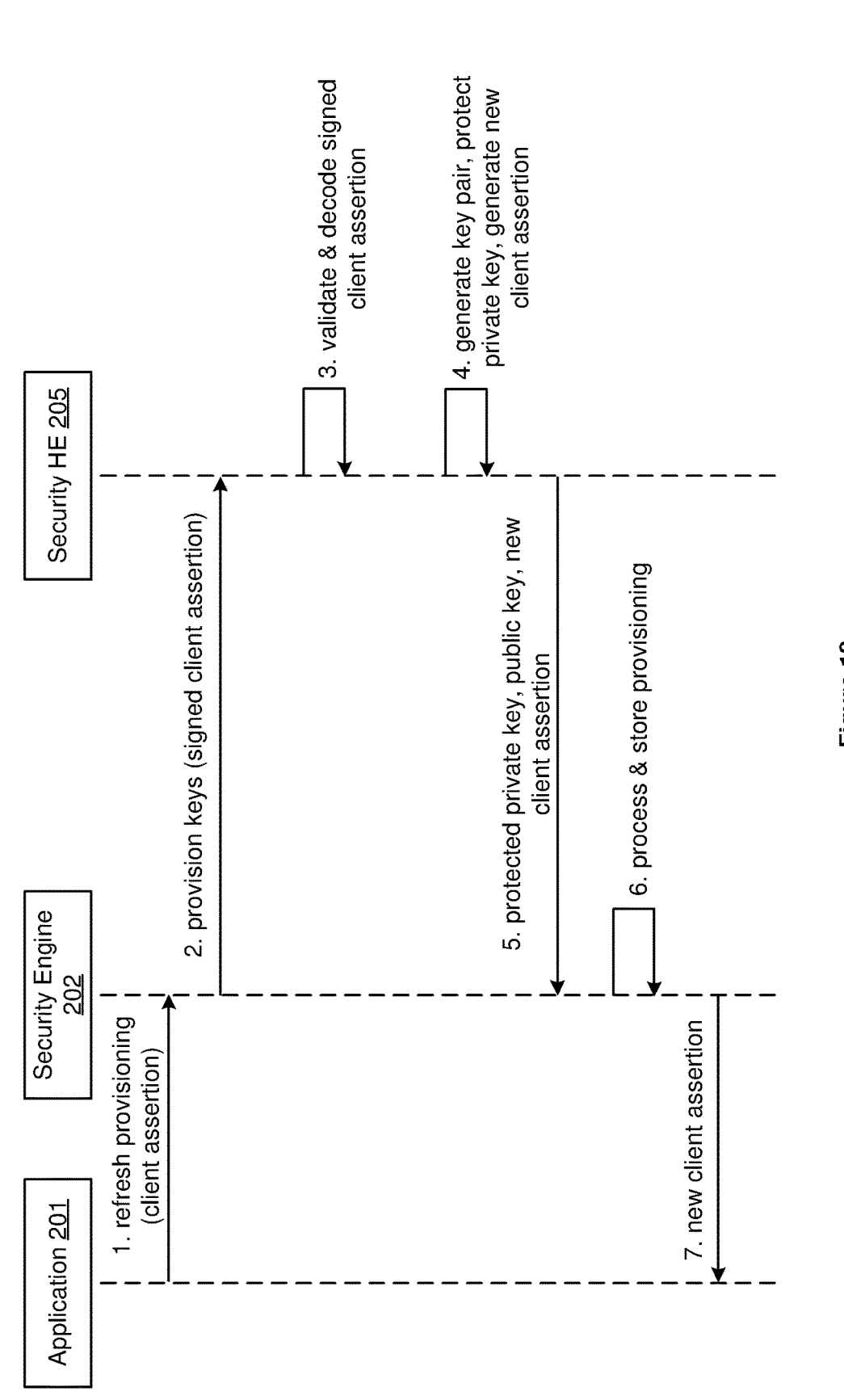

FIG. 10 is a sequence diagram 1000 illustrating the provisioning refresh state 307 in FIG. 3, in accordance with some embodiments. In some embodiments, the provisioning refresh state can be reached from the application authorization state. In the provisioning refresh state, the client public and private key pair as well as the client assertion object are refreshed. In step 1, the application 201 requests refresh provisioning from the security engine 202. In some embodiments, the request includes the current client assertion object. In step 2, the security engine 202 requests refresh provisioning of keys and the client assertion object from the security headend 205. In some embodiments, the security engine 202 uses the client private key to sign the client assertion object and attaches the client public key to the client assertion object. Because the client assertion object was signed using the server private key when provisioned by the server, the client assertion object sent to the security headend 205 in step 2 is signed with one inner signature corresponding to the server private key of the security headend 205 and one outer signature corresponding to the client private key.

In step 3, the security headend 205 validates and decodes the client assertion object. In some embodiments, the security headend 205 validates multiple signatures associated with the client assertion object. In some embodiments, because the client assertion object was signed using the server private key of the security headend 205, the security headend 205 uses the server public key of the security headend 205 to validate the inner signature of the client assertion object. In some embodiments, because the client assertion object was also signed with the client private key as described in step 2 above, the security headend 205 uses the client public key attached to the client assertion object to validate the outer signature. Further, in some embodiments, because the client assertion object includes the client public key (or a client public key hash), the security headend 205 validates the client assertion object by matching the client public key attached to the assertion object with the client public key included in the client assertion object. In some embodiments, the security headend 205 also validates additional data, e.g., incrementing a count of provisioning refresh requests from the client device and determining whether the number of provisioning refresh requests from the client device has exceeded a threshold over a period of time. Such validations make sure that the number of refresh provisioning requests received from the particular client device identified by the client assertion object over a period of time is lower than a threshold.

In step 4, the security headend 205 generates a provisioning response message that includes a client public and private key pair and a new client assertion object. In some embodiments, the client public and private key pair is securely generated by the server and protected, e.g., encrypted with a key in an obfuscated manner on the client device. In some embodiments, the security headend 205 signs the new client assertion object with a server private key of the security headend 205, where the corresponding server public key is known to the secure control plane. In some other embodiments, the security headend 205 signs the new client assertion object with a key shared with the secure control plane. In some embodiments, the new client assertion object includes the client public key from the client public and private key pair or a representation (e.g., a hash or thumbprint) of the client public key. In some embodiments, the client assertion object also includes the information provided in the initial provisioning token (e.g., the user ID and/or the EUID) and/or an expiration time for the new assertion object.

In some embodiments, the provisioning response message is protected and verifiable by the security engine 202. In particular, the security engine 202 can decode the information in the provisioning response message and validate that the information indeed came from the security headend 205. For example, the provisioning response message can be encrypted by a key shared between the security headend 205 and the security engine 202, where the key is protected in accordance with some embodiments, e.g., obfuscated on the client device. In another example, the provisioning response message can be signed with a server private key of the security headend 205, where the security engine 202 has a corresponding server public key.

In step 5, the security headend 205 sends the provisioning response message to the security engine 202. Upon receiving the provisioning response message, in step 6, the security engine 202 processes the provisioning response message and validates the information in the message. For example, the security engine 202 analyzes and/or records the client assertion expiration time, decodes the client public and private key pair, and prepares to use them in subsequent flows. In some embodiments, the security engine 202 securely persists the server provisioned data, e.g., using a secure hardware storage, applying encryption, and/or storing obfuscated key(s), etc. In step 7, the security engine 202 further sends the client assertion object to the application 201.

In some embodiments, during the provisioning refresh, the communications between the client device and the security headend 205 (e.g., steps 2 and 5) are protected using secure protocols, e.g., TLS. Once the provisioning refresh is completed, the security engine 202 is in possession of a new pair of client public and private keys that is resistant to attacks on the client environment. Further, the application 201 is in possession of a new client assertion object for subsequent flows, such as entering the application authorization state as shown in FIG. 6. In some embodiments, failures in completing the steps shown in FIG. 10 result in reverting back to the login state as shown in FIG. 4.

Figure 11:
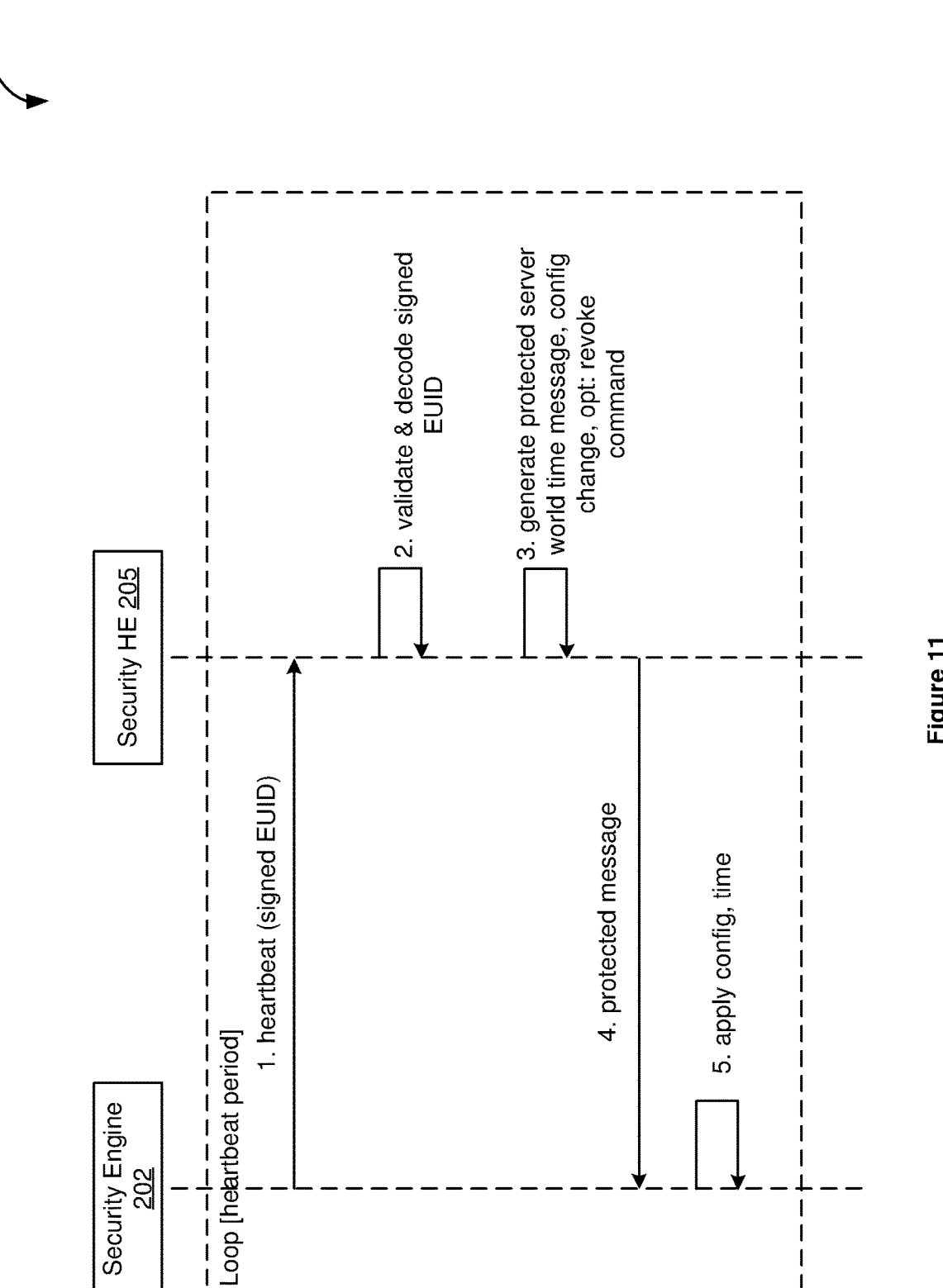

FIG. 11 is a sequence diagram 1100 illustrating the security heartbeat state 306 in FIG. 3, in accordance with some embodiments. In some embodiments, the client device periodically enters the security heartbeat state 306 to align the client notion of real-world time with the server notion of real-world time from the security headend 205. As such, in some embodiments, steps 1-5 are repeated every heartbeat period T to create a secure notion of time on the client side.

In step 1, the security engine 202 sends the security headend 205 a heartbeat request. In some embodiments, the heartbeat request includes a signed identifier known to the security headend 205 (e.g., the EUID signed by the client private key). In step 2, the security headend 205 validates the request, e.g., validating that the EUID is indeed signed by the client private key. In some embodiments, to validate the request, the security headend 205 looks up the matching client public key provisioned for the particular EUID. In step 3, the security headend 205 generates a protected message including the server notion of real-world time as well as configuration changes to be applied on security engine 202, e.g., changes in the error logging level and/or changes in the heartbeat period T, etc. In some embodiments, the protected message includes a "Revoke" command, which causes the client device to revert to the login state. In step 4, the security headend 205 sends the protected message to the security engine 202. In some embodiments, the protected message is protected by performing cryptographic operation(s) on the message, e.g., by encryption the message with the client public key or a shared key and/or by signing the message with the server private key of the security headend 205.

In step 5, the security engine 202 receives the message, applies configuration changes according to the message, and adjusts the client notion of real-world time based on the server notion in the message in accordance with some embodiments. In the case of a failure or having a revoke command in the message, the client device revokes its security configurations (e.g., by removing the client public and private key pair from the storage) and reverts to login state as shown in FIG. 4.

In some embodiments, in the security heartbeat state, the communications between the client device and the security headend 205 (e.g., steps 1 and 4) are protected using secure protocols, e.g., TLS. Once the security heartbeat configuration is complete, the client notion of real-world time is aligned with the server notion. The alignment makes the client environment more resistant to attacks. In some embodiments, failures in completing the steps shown in FIG. 11 result in the client device reverting to the login state shown in FIG. 4.

FIG. 12 is a flowchart illustrating a provisioning method 1200 for server controlled client authorization proof of possession in accordance with some embodiments. In some embodiments, as represented by block 1210, the method 1200 is performed at a first server (e.g., server 1 215-1, FIG. 2A) that includes one or more processors and a non-transitory memory. In some embodiments, as represented by block 1220, the method 1200 includes the first server provisioning for a client device (e.g., the client device 250, FIG. 2A) a real-world time, a client public key, and a client private key (e.g., as shown in step 10 in FIG. 5A). As represented by block 1230, the method 1200 further includes the first server generating one or more provisioning response messages that include one or more of the client public key, the client private key, the real-world time, and an assertion object, wherein the assertion object includes a reference to the client public key (e.g., as shown in steps 10 and 11 in FIG. 5A). Additionally, as represented by block 1240, the method 1200 includes the first server sending the one or more provisioning response messages to the client device (e.g., as shown in step 11 in FIG. 5A).

FIG. 13 is a flowchart illustrating a method 1300 for a client presenting a server provisioned authorization proof for authorization and access to resources in accordance with some embodiments. In some embodiments, as represented by block 1310, the method 1300 is performed at a client device (e.g., the client device 250, FIG. 2A) that includes one or more processors (e.g., the processor(s) 252, FIG. 2A) and a non-transitory memory (e.g., the memory 254, FIG. 2A). In some embodiments, as represented by block 1320, the method 1300 includes the client device (e.g., the security engine 202, FIG. 2A) obtaining an authorization proof token, where the authorization proof token is generated based on a client public key, a client private key, and a real-world time provisioned by a first server (e.g., server 1 215-1, FIG. 2A). As represented by block 1330, the method 1300 further includes the client device (e.g., the application(s) 201, FIG. 2A) generating a request including the authorization proof token and an assertion object obtained from the first server that is signed by a server private key of the first server and includes an expiration time and a reference to the client public key. As represented by block 1340, the method 1300 also includes the client device (e.g., the application(s) 201, FIG. 2A) sending the request to a second server, e.g., as in step 4 or step 5 of the application authorization state in FIG. 6).

Figure 14:
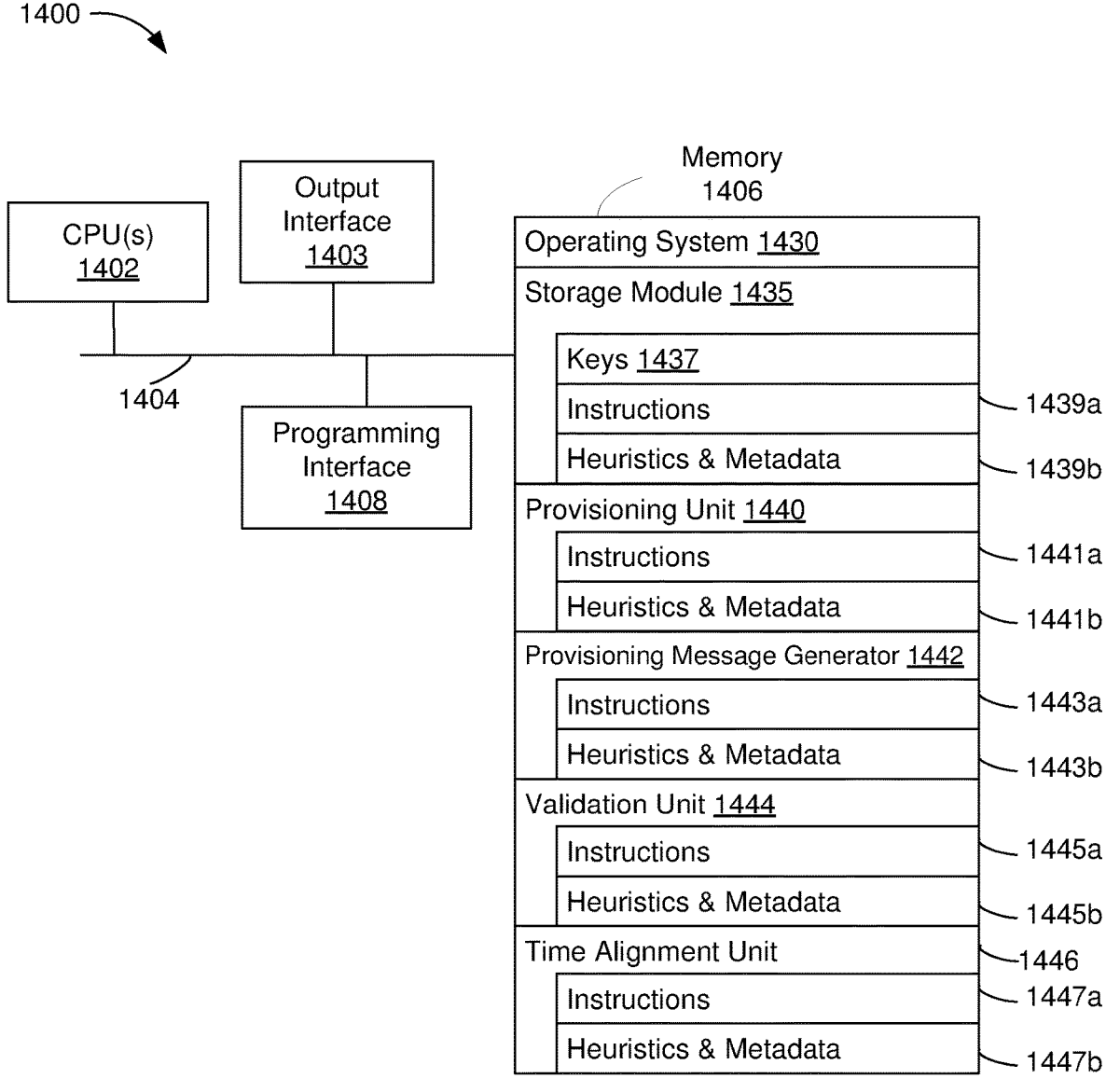
FIG. 14 is a block diagram of a computing device for server control of client authorization proof of possession, in accordance with some embodiments.

FIG. 14 is a block diagram of a computing device 1400 for server control of client authorization proof of possession in accordance with some embodiments. In some embodiments, the computing device 1400 corresponds to server 1 215-1 in FIG. 2A and/or the security headend 205 in FIGS. 2B and 2C and performs one or more of the functionalities described above with respect to server 1 215-1 and/or the security headend 205. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1400 includes one or more processing units (CPUs) 1402 (e.g., processors), one or more input/output interfaces 1403 (e.g., input devices, sensors, a network interface, a display, etc.), a memory 1406, a programming interface 1408, and one or more communication buses 1404 for interconnecting these and various other components.

In some embodiments, the communication buses 1404 include circuitry that interconnects and controls communications between system components. The memory 1406 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1406 optionally includes one or more storage devices remotely located from the CPU(s) 1402. The memory 1406 comprises a non-transitory computer readable storage medium. Moreover, in some embodiments, the memory 1406 or the non-transitory computer readable storage medium of the memory 1406 stores the following programs, modules and data structures, or a subset thereof including an optional operating system 1430, a storage module 1435, a provisioning unit 1440, a provisioning message generator 1442, a validation unit 1444, and a time alignment unit 1446. In some embodiments, one or more instructions are included in a combination of logic and non-transitory memory. The operating system 1430 includes procedures for handling various basic system services and for performing hardware dependent tasks.

In some embodiments, the storage module 1435 stores keys 1437 and/or other data to facilitate authentication and/or authorization. To that end, the storage module 1435 includes a set of instructions 1439*a* and heuristics and metadata 1439*b*.

In some embodiments, the provisioning unit 1440 is configured to provision keys 1437 and/or real-world time for client devices to facilitate client authorization proof of possession. To that end, the provisioning unit 1440 includes a set of instructions 1441*a* and heuristics and metadata 1441*b*.

In some embodiments, the provisioning message generator 1442 is configured to package key(s) 1437, token(s), and/or code(s) provisioned for client devices in message(s). To that end, the provisioning message generator 1442 includes a set of instructions 1443*a* and heuristics and metadata 1443*b*.

In some embodiments, the validation unit 1444 is configured to validate the data to client authorization proof of possession using the key(s) 1437. To that end, the validation unit 1444 includes a set of instructions 1445*a* and heuristics and metadata 1445*b*.

In some embodiments, the time alignment unit 1446 is configured to provision real-world time and/or periodic refresh intervals for client devices. To that end, the time alignment unit 1446 includes a set of instructions 1447*a* and heuristics and metadata 1447*b*.

Although the storage module 1435, the provisioning unit 1440, the provisioning message generator 1442, the validation unit 1444, and the time alignment unit 1446 are illustrated as residing on a single computing device 1400, it should be understood that in other embodiments, any combination of the storage module 1435, the provisioning unit 1440, the provisioning message generator 1442, the validation unit 1444, and the time alignment unit 1446 can reside in separate computing devices in various embodiments. For example, in some embodiments, each of the storage module 1435, the provisioning unit 1440, the provisioning message generator 1442, the validation unit 1444, and the time alignment unit 1446 resides on a separate computing device.

Moreover, FIG. 14 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a first server including one or more processors and a non-transitory memory:

obtaining, via a second server that is distinct from the first server, a provisioning request for a client device upon the second server successfully authenticating the client device;

in response to obtaining the provisioning request, provisioning, by the first server for the client device a real-world time, and generating, by the first server for the client device a first client public key and a first client private key;

generating one or more provisioning response messages that include the first client public key, the first client private key, the real-world time, and a first assertion object, wherein the first assertion object includes a reference to the first client public key and an expiration time;

sending the one or more provisioning response messages to the client device; and facilitating validation of the first assertion object by the second server and facilitating provisioning refresh of the first assertion object when the expiration time is within a threshold limit from the real-world time.

2. The method of claim 1, wherein the provisioning request includes an initial provisioning token for the client device, and the method further includes:

receiving, via the second server, a request for the initial provisioning token from the client device, wherein the request includes a unique identifier associated with the client device;

generating the initial provisioning token in response to receiving the request, including binding data to be included in the first assertion object to the unique identifier; and sending, via the second server, the initial provisioning token to the client device.

3. The method of claim 2, wherein:

a code is generated by the second server, bound to the unique identifier, and provided to the client device by the second server upon successful authentication of the client device by the second server;

the code is provided by the client device to the second server along with the request for the initial provisioning token; and the request for the initial provisioning token is forwarded by the second server to the first server upon a successful validation of the code from the client device by the second server.

4. The method of claim 1, wherein:

the first assertion object is signed with a first key; and facilitating validation of the first assertion object by the second server includes sharing the first key with the second server to validate the first assertion object.

5. The method of claim 1, wherein facilitating validation of the first assertion object by the second server includes:

receiving a validation request from the second server, wherein the validation request includes the first assertion object; and sending to the second server a validation indicator upon validating the first assertion object.

6. The method of claim 1, wherein:

the first server and the second server are distinct from a third server for providing resources to the client device; and the second server receives an authorization request for access to the third server including an application access token and parameters associated with the third server; validates the authorization request; and upon validating the authorization request, generates a resource server access token for access to the third server based on the parameters and sends the resource server access token to the client device, wherein the authorization request includes the first assertion object.

7. The method of claim 1, further comprising:

provisioning a symmetric signing key unique for the client device, wherein the client device uses the symmetric signing key to sign an authorization proof token, and the signed authorization proof token is verifiable by a third server.

8. The method of claim 7, further comprising:

synchronizing a secret between the first server and the second server, wherein the second server shares the secret with the third server, wherein provisioning the symmetric signing key unique for the client device includes:

generating a wrap for the symmetric signing key by encrypting the symmetric signing key with the secret, and sending the symmetric signing key, the wrap, and a key identifier associated with the secret to the client device.

9. The method of claim 7, further comprising:

synchronizing a seed between the first server and the second server, wherein the second server shares the seed with the third server, wherein provisioning the symmetric signing key unique for the client device includes:

deriving the symmetric signing key from the seed, and sending the symmetric signing key and a key identifier associated with the seed to the client device.

10. The method of claim 7, wherein provisioning the symmetric signing key unique for the client device includes causing the third server to store the symmetric signing key and a client identifier associated with the symmetric signing key in a data store.

11. The method of claim 7, further comprising:

creating a replacement shared secret periodically to replace a shared secret for provisioning the symmetric signing key, wherein the replacement shared secret is shared between the first server and the second server distinct from the first server, and deployed to the third server, distinct from the first server and the second server; and retaining the shared secret on the third server for a period of time for requests from the client device signed with the symmetric signing key provisioned based on the shared secret before retiring the shared secret.

12. The method of claim 1, further comprising:

receiving a provisioning refresh request from the client device, wherein the provisioning refresh request includes the first assertion object;

in response to receiving the provisioning refresh request, provisioning a second client public key and provisioning a second client private key;

generating a second provisioning response message that includes the second client public key, the second client private key, and a second assertion object, wherein the second assertion object is generated based on the first assertion object and includes a second reference to the second client public key and a second expiration time; and sending the second provisioning response message to the client device.

13. The method of claim 12, wherein the first assertion object is signed with a first signature corresponding to a server private key of the first server and signed with a second signature corresponding to the first client private key, the first client public key is attached to the first assertion object, and the method further includes validating the first assertion object in response to receiving the provisioning refresh request, including:

validating the first signature using a server public key of the first server;

validating the second signature using the first client public key attached to the first assertion object; and matching the first client public key attached to the first assertion object with the first client public key or a hash of the first client public key included in the first assertion object.

14. The method of claim 13, wherein validating the first assertion object in response to receiving the provisioning refresh request includes:

incrementing a count of provisioning refresh requests from the client device; and determining whether the number of provisioning refresh requests from the client device has exceeded a threshold over a period of time.

15. The method of claim 1, wherein sending the one or more provisioning response messages to the client device includes:

protecting the one or more provisioning response messages by performing one or more cryptographic operations on the one or more provisioning response messages prior to sending the one or more provisioning response messages, wherein the protected one or more provisioning response messages are verifiable by the client device.

16. The method of claim 1, further comprising:

generating a protected message with configuration changes including a server notion of real-world time; and sending the protected message with the configuration changes to the client device and causing the client device to apply the configuration changes, including causing the client device to align a client notion of real-world time with the server notion of real-world time.

17. The method of claim 16, wherein the protected message with the configuration changes includes a periodic refresh interval for the client device to generate a heartbeat request.

18. A first server comprising:

one or more processors; and a non-transitory memory storing computer readable instructions, which when executed by the one or more processors, cause the first server to:

obtain, via a second server that is distinct from the first server, a provisioning request for a client device upon the second server successfully authenticating the client device;

in response to obtaining the provisioning request, provision, by the first server for the client device a real-world time, and generate, by the first server for the client device a first client public key and a first client private key;

generate one or more provisioning response messages that include the first client public key, the first client private key, the real-world time, and a first assertion object, wherein the first assertion object includes a reference to the first client public key and an expiration time;

send the one or more provisioning response messages to the client device; and facilitate validation of the first assertion object by the second server and facilitate provisioning refresh of the first assertion object when the expiration time is within a threshold limit from the real-world time.

19. A non-transitory computer-readable medium that includes computer-readable instructions stored thereon that are executed by one or more processors of a first server to perform operations comprising:

obtaining, via a second server that is distinct from the first server, a provisioning request for a client device upon the second server successfully authenticating the client device;

in response to obtaining the provisioning request, provisioning, by the first server for the client device a real-world time, and generating, by the first server for the client device a first client public key and a first client private key;

generating one or more provisioning response messages that include the first client public key, the first client private key, the real-world time, and a first assertion object, wherein the first assertion object includes a reference to the first client public key and an expiration time;

sending the one or more provisioning response messages to the client device; and facilitating validation of the first assertion object by the second server and facilitating provisioning refresh of the first assertion object when the expiration time is within a threshold limit from the real-world time.

* * * * *